US012576348B2

(12) United States Patent
Oren et al.

(10) Patent No.: US 12,576,348 B2
(45) Date of Patent: Mar. 17, 2026

(54) ADVANCED FUEL FILTRATION SYSTEM WITH INTERLOCKING CARTRIDGE SEAL DESIGN

(71) Applicant: Cummins Filtration Inc., Nashville, TN (US)

(72) Inventors: Connor David Oren, Columbus, IN (US); Zemin Jiang, Cookeville, TN (US); Jayant Singh, Pune (IN); Vaibhav Pimpalte, Pune (IN); Chetan Ghagre, Wardha (IN); Bharati Pundalik Dalavi, Ambernath (IN); Sagar Padale, Pune (IN); Sunny Nabhiraj Masutage, Miraj (IN); Joshua Luther Young, Livingston, TN (US)

(73) Assignee: ATMUS FILTRATION INC., Nashville, TN (US)

( * ) Notice: Subject to any disclaimer, the term of this patent is extended or adjusted under 35 U.S.C. 154(b) by 684 days.

(21) Appl. No.: 17/883,163

(22) Filed: Aug. 8, 2022

(65) Prior Publication Data

US 2022/0379245 A1      Dec. 1, 2022

Related U.S. Application Data

(63) Continuation of application No. PCT/US2021/017197, filed on Feb. 9, 2021.

(30) Foreign Application Priority Data

Feb. 11, 2020    (IN) .............................. 202041005898

(51) Int. Cl.
  *B01D 29/21*      (2006.01)
  *B01D 29/58*      (2006.01)
      (Continued)

(52) U.S. Cl.
  CPC ............. *B01D 29/21* (2013.01); *B01D 29/58* (2013.01); *B01D 35/16* (2013.01); *B01D 36/003* (2013.01);
      (Continued)

(58) Field of Classification Search
  CPC ........ B01D 29/21; B01D 29/58; B01D 35/16; B01D 36/003; B01D 2201/0423;
      (Continued)

(56) References Cited

U.S. PATENT DOCUMENTS 2,025,009 A    12/1935  Baker
2,093,877 A     9/1937  Von Pentz
      (Continued)

FOREIGN PATENT DOCUMENTS

CN      1130539 A    9/1996
CN      1139884 A    1/1997
      (Continued)

OTHER PUBLICATIONS

Non-Final Office Action on U.S. Appl. No. 16/487,209 DTD Oct. 18, 2022.
      (Continued)

*Primary Examiner* — Madeline Gonzalez
(74) *Attorney, Agent, or Firm* — Benesch Friedlander Coplan & Aronoff LLP

(57)      ABSTRACT

A filter assembly includes a filter element and a filter housing. The filter housing includes a shell defining an inner cavity, and a lid configured to engage the shell at an opening of the inner cavity. The filter element is disposed within the inner cavity and includes a media pack, a first endplate, and a sealing member. The first endplate is sealingly engaged with a media pack first end and includes a skirt extending along a longitudinal axis of the media pack from the first end toward the second end. The sealing member is coupled to the
      (Continued)

skirt and is positioned between and forms a seal between the lid and the shell.

20 Claims, 17 Drawing Sheets

(51) Int. Cl.
  B01D 35/16 (2006.01)
  B01D 36/00 (2006.01)
(52) U.S. Cl.
  CPC ............... *B01D 2201/0423* (2013.01); *B01D 2201/298* (2013.01); *B01D 2201/301* (2013.01); *B01D 2201/347* (2013.01)
(58) Field of Classification Search
  CPC ........ B01D 2201/298; B01D 2201/301; B01D 2201/347; B01D 29/56; B01D 2201/0415; B01D 2201/295; B01D 2201/34; B01D 35/31
  USPC .... 210/317, 315, 338, 342, 450, 493.2, 455, 210/248
  See application file for complete search history.

(56) References Cited

U.S. PATENT DOCUMENTS

| | | | |
|---|---|---|---|
| 2,270,969 A | 1/1942 | Robinson | |
| 2,306,325 A | 12/1942 | Sidney | |
| 2,559,267 A | 7/1951 | Winslow et al. | |
| 2,910,332 A | 10/1959 | Madsen | |
| 2,915,188 A | 12/1959 | Buker | |
| 2,955,028 A | 10/1960 | Bevans | |
| 3,025,963 A | 3/1962 | Bauer | |
| 3,224,592 A | 12/1965 | Burns et al. | |
| 3,383,841 A | 5/1968 | Olson | |
| 3,384,241 A | 5/1968 | Stoughton et al. | |
| 3,494,113 A | 2/1970 | Kinney | |
| 3,576,095 A | 4/1971 | Rivers | |
| 3,582,095 A | 6/1971 | Bogaert | |
| 3,598,738 A | 8/1971 | Du Pont | |
| 3,645,402 A | 2/1972 | Alexander et al. | |
| 3,687,849 A | 8/1972 | Abbott | |
| 3,749,247 A | 7/1973 | Rohde | |
| 4,014,794 A | 3/1977 | Lewis | |
| 4,061,572 A | 12/1977 | Cohen et al. | |
| 4,066,559 A | 1/1978 | Rohde | |
| 4,075,097 A | 2/1978 | Paul | |
| 4,075,098 A | 2/1978 | Paul et al. | |
| 4,080,185 A | 3/1978 | Richter et al. | |
| 4,128,251 A | 12/1978 | Gaither et al. | |
| 4,129,429 A | 12/1978 | Humbert et al. | |
| 4,144,169 A | 3/1979 | Grueschow | |
| 4,181,313 A | 1/1980 | Hillier et al. | |
| 4,211,543 A | 7/1980 | Tokar et al. | |
| 4,253,954 A * | 3/1981 | Midkiff | B01D 36/003 |
| | | | 210/DIG. 5 |
| 4,257,890 A | 3/1981 | Hurner | |
| 4,300,928 A | 11/1981 | Sugie | |
| 4,324,213 A | 4/1982 | Kasting et al. | |
| 4,364,751 A | 12/1982 | Copley | |
| 4,402,912 A | 9/1983 | Krueger et al. | |
| 4,410,427 A | 10/1983 | Wydeven | |
| 4,473,471 A | 9/1984 | Robichaud et al. | |
| 4,572,522 A | 2/1986 | Smagatz | |
| 4,589,983 A | 5/1986 | Wydevan | |
| 4,600,420 A | 7/1986 | Wydeven et al. | |
| 4,617,122 A | 10/1986 | Kruse et al. | |
| 4,738,776 A | 4/1988 | Brown | |
| 4,755,289 A | 7/1988 | Villani | |
| 4,782,891 A | 11/1988 | Cheadle et al. | |
| 4,826,517 A | 5/1989 | Norman | |
| 4,861,359 A | 8/1989 | Tettman | |
| 4,865,636 A | 9/1989 | Raber | |
| 4,915,831 A | 4/1990 | Taylor | |
| 4,925,561 A | 5/1990 | Ishii et al. | |
| 4,951,834 A | 8/1990 | Aikins | |
| 4,979,969 A | 12/1990 | Herding | |
| 5,024,268 A | 6/1991 | Cheadle et al. | |
| 5,050,549 A | 9/1991 | Sturmon | |
| 5,069,799 A | 12/1991 | Brownawell et al. | |
| 5,071,456 A | 12/1991 | Binder et al. | |
| 5,094,745 A | 3/1992 | Reynolds | |
| 5,114,572 A | 5/1992 | Hunter et al. | |
| 5,120,334 A | 6/1992 | Cooper | |
| 5,171,430 A | 12/1992 | Beach et al. | |
| 5,203,994 A | 4/1993 | Janik | |
| 5,213,596 A | 5/1993 | Kume et al. | |
| 5,222,488 A | 6/1993 | Forsgren | |
| 5,223,011 A | 6/1993 | Hanni | |
| 5,225,081 A | 7/1993 | Brownawell | |
| 5,228,891 A | 7/1993 | Adiletta | |
| 5,258,118 A | 11/1993 | Gouritin et al. | |
| 5,298,160 A | 3/1994 | Ayers et al. | |
| 5,302,284 A | 4/1994 | Zeiner et al. | |
| 5,342,511 A | 8/1994 | Brown et al. | |
| 5,382,355 A | 1/1995 | Arlozynski | |
| 5,391,212 A | 2/1995 | Ernst et al. | |
| 5,435,346 A | 7/1995 | Tregidgo et al. | |
| 5,459,074 A | 10/1995 | Muoni | |
| 5,472,379 A | 12/1995 | Andress et al. | |
| 5,472,463 A | 12/1995 | Herman et al. | |
| 5,484,466 A | 1/1996 | Brown et al. | |
| 5,494,497 A | 2/1996 | Lee | |
| 5,498,332 A | 3/1996 | Handtmann | |
| 5,512,074 A | 4/1996 | Hanni et al. | |
| 5,531,848 A | 7/1996 | Brinda et al. | |
| 5,556,542 A | 9/1996 | Berman et al. | |
| 5,560,330 A | 10/1996 | Andress et al. | |
| 5,562,825 A | 10/1996 | Yamada et al. | |
| 5,569,311 A | 10/1996 | Oda et al. | |
| 5,575,826 A | 11/1996 | Gillingham et al. | |
| 5,591,330 A | 1/1997 | Lefebvre | |
| 5,605,554 A | 2/1997 | Kennedy | |
| 5,662,799 A | 9/1997 | Hudgens et al. | |
| 5,672,399 A | 9/1997 | Kahlbaugh et al. | |
| 5,702,602 A | 12/1997 | Brown et al. | |
| 5,709,722 A | 1/1998 | Nagai et al. | |
| 5,720,790 A | 2/1998 | Kometani et al. | |
| 5,738,785 A | 4/1998 | Brown et al. | |
| 5,753,116 A | 5/1998 | Baumann et al. | |
| 5,753,117 A | 5/1998 | Jiang | |
| 5,753,120 A | 5/1998 | Clausen et al. | |
| 5,759,217 A | 6/1998 | Joy | |
| 5,770,065 A | 6/1998 | Popoff et al. | |
| 5,772,883 A | 6/1998 | Rothman et al. | |
| 5,793,566 A | 8/1998 | Scura et al. | |
| 5,795,361 A | 8/1998 | Lanier et al. | |
| 5,803,024 A | 9/1998 | Brown | |
| 5,820,646 A | 10/1998 | Gillingham et al. | |
| 5,830,371 A | 11/1998 | Smith et al. | |
| 5,853,439 A | 12/1998 | Gieseke et al. | |
| 5,855,772 A | 1/1999 | Miller et al. | |
| 5,863,424 A | 1/1999 | Lee | |
| 5,891,402 A | 4/1999 | Sassa et al. | |
| 5,893,939 A | 4/1999 | Rakocy et al. | |
| 5,902,364 A | 5/1999 | Tokar et al. | |
| 5,948,248 A | 9/1999 | Brown | |
| 5,985,143 A | 11/1999 | Lin | |
| 6,045,692 A | 4/2000 | Bilski et al. | |
| D425,189 S | 5/2000 | Gillingham et al. | |
| 6,086,763 A | 7/2000 | Baumann | |
| 6,096,208 A | 8/2000 | Connelly et al. | |
| 6,098,575 A | 8/2000 | Mulshine et al. | |
| 6,099,612 A | 8/2000 | Bartos | |
| 6,113,781 A | 9/2000 | Popoff et al. | |
| 6,117,202 A | 9/2000 | Wetzel | |
| 6,123,746 A | 9/2000 | Alvin et al. | |
| 6,129,852 A | 10/2000 | Elliott et al. | |
| 6,149,700 A | 11/2000 | Morgan et al. | |
| 6,171,355 B1 | 1/2001 | Gieseke et al. | |
| 6,171,491 B1 | 1/2001 | Popoff et al. | |
| 6,179,890 B1 | 1/2001 | Ramos et al. | |

(56)        References Cited

U.S. PATENT DOCUMENTS

| | | | |
|---|---|---|---|
| D437,402 S | 2/2001 | Gieseke et al. |
| 6,190,432 B1 | 2/2001 | Gieseke et al. |
| 6,196,019 B1 | 3/2001 | Higo et al. |
| 6,217,627 B1 | 4/2001 | Vyskocil et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin et al. |
| 6,238,561 B1 | 5/2001 | Liu et al. |
| 6,261,334 B1 | 7/2001 | Morgan et al. |
| 6,264,831 B1 | 7/2001 | Hawkins et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,322,697 B1 | 11/2001 | Hacker et al. |
| 6,348,085 B1 | 2/2002 | Tokar et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,447,566 B1 | 9/2002 | Rivera et al. |
| 6,475,379 B2 | 11/2002 | Jousset et al. |
| 6,478,018 B2 | 11/2002 | Fedorowicz et al. |
| 6,478,019 B2 | 11/2002 | Fedorowicz et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,571,962 B2 | 6/2003 | Thomas |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,740,234 B1 | 5/2004 | Williams et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,823,996 B2 | 11/2004 | Durre |
| 6,827,750 B2 | 12/2004 | Drozd et al. |
| 6,835,304 B2 | 12/2004 | Jousset et al. |
| 6,837,920 B2 | 1/2005 | Gieseke et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,922,894 B2 | 8/2005 | Durre |
| 6,939,464 B1 | 9/2005 | Jiang et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 6,996,940 B2 | 2/2006 | Beasley |
| 6,998,045 B2 | 2/2006 | Durre |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,048,501 B2 | 5/2006 | Katayama et al. |
| 7,070,641 B1 | 7/2006 | Gunderson et al. |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke |
| 7,217,361 B2 | 5/2007 | Connor et al. |
| 7,237,682 B2 | 7/2007 | Reynolds et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,311,747 B2 | 12/2007 | Adamek et al. |
| 7,338,544 B2 | 3/2008 | Sporre et al. |
| 7,344,582 B2 | 3/2008 | Pearson et al. |
| 7,351,270 B2 | 4/2008 | Engelland et al. |
| 7,396,375 B2 | 7/2008 | Nepsund et al. |
| 7,425,226 B2 | 9/2008 | Powell |
| 7,435,341 B2 | 10/2008 | Crawford et al. |
| 7,491,254 B2 | 2/2009 | Krisko et al. |
| 7,494,017 B2 | 2/2009 | Miller |
| 7,524,416 B1 | 4/2009 | Bergmen |
| 7,540,895 B2 | 6/2009 | Furseth et al. |
| D600,790 S | 9/2009 | Nelson et al. |
| 7,582,130 B2 | 9/2009 | Ng et al. |
| 7,614,504 B2 | 11/2009 | South et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,662,216 B1 | 2/2010 | Terres et al. |
| 7,674,308 B2 | 3/2010 | Krisko et al. |
| 7,682,416 B2 | 3/2010 | Engelland et al. |
| 7,682,507 B2 | 3/2010 | Stamey et al. |
| 7,731,753 B2 | 6/2010 | Reo et al. |
| 7,776,139 B2 | 8/2010 | Schwandt et al. |
| 7,799,108 B2 | 9/2010 | Connor et al. |
| 7,828,869 B1 | 11/2010 | Parikh et al. |
| 7,882,961 B2 | 2/2011 | Menez et al. |
| 7,931,723 B2 | 4/2011 | Cuvelier |
| 7,935,255 B2 | 5/2011 | Jiang |
| 7,959,714 B2 | 6/2011 | Smith et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,043,504 B2 | 10/2011 | Malgorn |
| 8,048,187 B2 | 11/2011 | Merritt et al. |
| 8,057,669 B2 | 11/2011 | Beard et al. |
| 8,061,530 B2 | 11/2011 | Kindkeppel et al. |
| 8,062,399 B2 | 11/2011 | Nelson et al. |
| 8,096,423 B2 | 1/2012 | Menez et al. |
| 8,097,061 B2 | 1/2012 | Smith et al. |
| 8,101,003 B2 | 1/2012 | Krisko et al. |
| 8,119,002 B2 | 2/2012 | Schiavon et al. |
| 8,146,751 B2 | 4/2012 | Hawkins et al. |
| 8,167,966 B2 | 5/2012 | Amirkhanian et al. |
| 8,177,967 B2 | 5/2012 | Bagci et al. |
| 8,211,199 B2 | 7/2012 | Holmes et al. |
| 8,216,470 B2 | 7/2012 | Abdalla et al. |
| 8,220,640 B2 | 7/2012 | Schmitz et al. |
| 8,236,176 B2 | 8/2012 | Fall et al. |
| 8,241,383 B2 | 8/2012 | Schrage et al. |
| 8,276,763 B2 | 10/2012 | Shaam |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,333,890 B2 | 12/2012 | Wells et al. |
| 8,348,064 B2 | 1/2013 | Tandon |
| 8,357,219 B2 | 1/2013 | Boehrs et al. |
| 8,419,938 B2 | 4/2013 | Ries et al. |
| 8,430,657 B2 | 4/2013 | Simonelli et al. |
| 8,440,081 B2 | 5/2013 | Wieczorek |
| 8,480,779 B2 | 7/2013 | Boehrs et al. |
| 8,496,723 B2 | 7/2013 | Reichter et al. |
| 8,501,001 B2 | 8/2013 | Curt et al. |
| 8,506,666 B2 | 8/2013 | Haslebacher |
| 8,517,183 B2 | 8/2013 | Thomas et al. |
| 8,518,141 B2 | 8/2013 | Schrage et al. |
| 8,544,158 B2 | 10/2013 | Curt et al. |
| 8,550,656 B2 | 10/2013 | Mccarthy et al. |

(56) References Cited

U.S. PATENT DOCUMENTS

| | | | |
|---|---|---|---|
| 8,562,707 B2 | 10/2013 | Nepsund et al. | |
| 8,636,820 B2 | 1/2014 | Reichter et al. | |
| 8,652,228 B2 | 2/2014 | Krisko et al. | |
| 8,709,119 B2 | 4/2014 | Reichter et al. | |
| 8,709,247 B2 | 4/2014 | Beard et al. | |
| 8,714,565 B1 | 5/2014 | Cornett et al. | |
| 8,753,414 B2 | 6/2014 | Gebert | |
| 8,778,043 B2 | 7/2014 | Krisko et al. | |
| 8,840,699 B2 | 9/2014 | Bruce et al. | |
| 8,845,897 B2 | 9/2014 | Wieczorek et al. | |
| 8,852,308 B2 | 10/2014 | Jarrier | |
| 8,906,128 B2 | 12/2014 | Reichter et al. | |
| 8,911,498 B2 | 12/2014 | Bartish et al. | |
| 8,926,725 B2 | 1/2015 | Loken et al. | |
| 8,932,465 B2 | 1/2015 | Wells et al. | |
| 9,011,683 B2 | 4/2015 | South et al. | |
| 9,101,883 B2 | 8/2015 | Pugh et al. | |
| 9,114,346 B2 | 8/2015 | Schrage et al. | |
| 9,211,488 B2 | 12/2015 | South et al. | |
| 9,308,476 B2 | 4/2016 | Martin et al. | |
| 9,308,482 B2 | 4/2016 | Kaiser | |
| 9,320,997 B2 | 4/2016 | Campbell et al. | |
| 9,409,107 B2 | 8/2016 | Arakeri et al. | |
| 9,415,333 B2 | 8/2016 | Kindkeppel et al. | |
| 9,500,167 B2 | 11/2016 | Verdegan et al. | |
| 9,724,627 B2 | 8/2017 | Malgorn et al. | |
| 9,782,706 B1 | 10/2017 | Levy | |
| 9,782,708 B2 | 10/2017 | Kindkeppel et al. | |
| 9,943,790 B2 | 4/2018 | Page et al. | |
| 10,010,816 B2 | 7/2018 | Moessinger et al. | |
| 10,279,424 B2 | 5/2019 | Sudermann et al. | |
| 10,300,417 B2 | 5/2019 | Wuebbeling | |
| 10,309,078 B2 | 6/2019 | Wells et al. | |
| 10,316,804 B2 | 6/2019 | Hasenfratz et al. | |
| 10,343,099 B2 | 7/2019 | Kaiser | |
| 10,493,385 B2 | 12/2019 | Glazewski et al. | |
| 10,556,200 B2 | 2/2020 | Dirnberger et al. | |
| 10,661,207 B2 | 5/2020 | Page et al. | |
| 10,662,905 B2 | 5/2020 | Dirnberger et al. | |
| 10,682,597 B2 | 6/2020 | Krull et al. | |
| 10,729,999 B2 | 8/2020 | Nichols et al. | |
| 10,731,315 B2 | 8/2020 | Wells et al. | |
| 10,744,443 B2 | 8/2020 | Silvestro | |
| 10,835,852 B2 | 11/2020 | Decoster et al. | |
| 11,091,895 B2 | 8/2021 | Wells et al. | |
| 11,141,687 B2 | 10/2021 | Knight et al. | |
| 11,198,077 B2 | 12/2021 | Jiang et al. | |
| 11,285,411 B2 | 3/2022 | Burgan et al. | |
| 11,413,559 B2 | 8/2022 | Glazewski et al. | |
| 11,446,595 B2 | 9/2022 | Malgorn et al. | |
| 11,452,958 B2 | 9/2022 | Page et al. | |
| 11,655,609 B2 | 5/2023 | Wells et al. | |
| 11,724,220 B2 | 8/2023 | Ouweleen et al. | |
| 2001/0032545 A1 | 10/2001 | Goto et al. | |
| 2002/0046556 A1 | 4/2002 | Reid | |
| 2002/0060178 A1 | 5/2002 | Tsabari | |
| 2002/0073850 A1 | 6/2002 | Tokar et al. | |
| 2002/0096247 A1 | 7/2002 | Wydeven | |
| 2002/0157359 A1 | 10/2002 | Stenersen et al. | |
| 2002/0158006 A1 | 10/2002 | Thomas | |
| 2002/0170280 A1 | 11/2002 | Soh | |
| 2002/0185007 A1 | 12/2002 | Xu et al. | |
| 2002/0185454 A1 | 12/2002 | Beard et al. | |
| 2002/0195384 A1 | 12/2002 | Rohrbach et al. | |
| 2003/0121845 A1 | 7/2003 | Wagner et al. | |
| 2003/0154863 A1 | 8/2003 | Tokar et al. | |
| 2003/0184025 A1 | 10/2003 | Matsuki | |
| 2003/0218150 A1 | 11/2003 | Blakemore et al. | |
| 2003/0226790 A1 | 12/2003 | Brown et al. | |
| 2004/0031745 A1 | 2/2004 | Moessinger et al. | |
| 2004/0035097 A1 | 2/2004 | Schlensker et al. | |
| 2004/0040271 A1 | 3/2004 | Kopec et al. | |
| 2004/0060861 A1 | 4/2004 | Winter et al. | |
| 2004/0091652 A1 | 5/2004 | Kikuchi et al. | |
| 2004/0091654 A1 | 5/2004 | Kelly et al. | |
| 2004/0140255 A1 | 7/2004 | Merritt et al. | |
| 2004/0173097 A1 | 9/2004 | Engelland et al. | |
| 2004/0187689 A1 | 9/2004 | Sporre et al. | |
| 2004/0221555 A1 | 11/2004 | Engelland et al. | |
| 2004/0226443 A1 | 11/2004 | Gillingham et al. | |
| 2005/0019236 A1 | 1/2005 | Martin et al. | |
| 2005/0024061 A1 | 2/2005 | Cox et al. | |
| 2005/0166561 A1 | 8/2005 | Schrage et al. | |
| 2005/0173325 A1 | 8/2005 | Klein et al. | |
| 2005/0178706 A1 | 8/2005 | Bagei | |
| 2005/0178714 A1 | 8/2005 | Stockbower | |
| 2005/0178715 A1 | 8/2005 | Thomas et al. | |
| 2005/0193695 A1 | 9/2005 | Holmes et al. | |
| 2005/0194312 A1 | 9/2005 | Niemeyer et al. | |
| 2005/0224061 A1 | 10/2005 | Ulrich et al. | |
| 2005/0252848 A1 | 11/2005 | Miller | |
| 2006/0064956 A1 | 3/2006 | Connor et al. | |
| 2006/0113233 A1 | 6/2006 | Merritt et al. | |
| 2006/0118474 A1 | 6/2006 | Kolczyk et al. | |
| 2006/0180537 A1 | 8/2006 | Loftis et al. | |
| 2006/0213139 A1 | 9/2006 | Stramandinoli | |
| 2006/0219626 A1 | 10/2006 | Dworatzek et al. | |
| 2007/0037428 A1 | 2/2007 | Annecke | |
| 2007/0045167 A1 | 3/2007 | Jaroszczyk et al. | |
| 2007/0095744 A1 | 5/2007 | Bagci et al. | |
| 2007/0175815 A1 | 8/2007 | Thomas | |
| 2007/0193929 A1* | 8/2007 | Brown | B01D 29/21 |
| | | | 210/90 |
| 2007/0240392 A1 | 10/2007 | Ng et al. | |
| 2007/0261374 A1 | 11/2007 | Nelson et al. | |
| 2007/0267338 A1 | 11/2007 | Menez et al. | |
| 2008/0011672 A1 | 1/2008 | Schwartz et al. | |
| 2008/0022641 A1 | 1/2008 | Engelland et al. | |
| 2008/0035587 A1 | 2/2008 | Wieczorek et al. | |
| 2008/0047132 A1 | 2/2008 | Wieczorek | |
| 2008/0087589 A1 | 4/2008 | Grzonka et al. | |
| 2008/0107765 A1 | 5/2008 | Considine et al. | |
| 2008/0110142 A1 | 5/2008 | Nelson et al. | |
| 2008/0179263 A1 | 7/2008 | Wieczorek et al. | |
| 2008/0237113 A1 | 10/2008 | Jensen | |
| 2008/0250766 A1 | 10/2008 | Schrage et al. | |
| 2008/0307759 A1 | 12/2008 | Reichter et al. | |
| 2008/0308481 A1 | 12/2008 | Wieczorek et al. | |
| 2009/0014381 A1 | 1/2009 | South et al. | |
| 2009/0026124 A1 | 1/2009 | Schmitz et al. | |
| 2009/0050554 A1 | 2/2009 | Shaam | |
| 2009/0057213 A1 | 3/2009 | Schiavon et al. | |
| 2009/0057219 A1 | 3/2009 | Bagci et al. | |
| 2009/0064646 A1 | 3/2009 | Reichter et al. | |
| 2009/0071892 A1* | 3/2009 | Malgorn | F02M 37/32 |
| | | | 210/256 |
| 2009/0090669 A1 | 4/2009 | Holzmann et al. | |
| 2009/0095669 A1 | 4/2009 | South | |
| 2009/0126324 A1 | 5/2009 | Smith et al. | |
| 2009/0127198 A1 | 5/2009 | Salvador et al. | |
| 2009/0135590 A1 | 5/2009 | Mccarthy et al. | |
| 2009/0151311 A1 | 6/2009 | Reichter et al. | |
| 2009/0193972 A1 | 8/2009 | Schwandt et al. | |
| 2009/0241315 A1 | 10/2009 | Menez et al. | |
| 2009/0242475 A2 | 10/2009 | Menez et al. | |
| 2009/0249754 A1 | 10/2009 | Amirkhanian et al. | |
| 2009/0326657 A1 | 12/2009 | Grinberg et al. | |
| 2010/0001477 A1 | 1/2010 | Eyers et al. | |
| 2010/0043366 A1 | 2/2010 | Boehrs et al. | |
| 2010/0051528 A1 | 3/2010 | Derstler et al. | |
| 2010/0064646 A1 | 3/2010 | Smith et al. | |
| 2010/0065203 A1 | 3/2010 | Tanbour et al. | |
| 2010/0077710 A1 | 4/2010 | Severance et al. | |
| 2010/0101993 A1 | 4/2010 | Wells et al. | |
| 2010/0108590 A1 | 5/2010 | Curt et al. | |
| 2010/0114318 A1 | 5/2010 | Gittings et al. | |
| 2010/0126919 A1 | 5/2010 | Hawkins et al. | |
| 2010/0150764 A1 | 6/2010 | Simonelli et al. | |
| 2010/0170209 A1 | 7/2010 | Nelson et al. | |
| 2010/0176047 A1 | 7/2010 | Bagci et al. | |
| 2010/0186353 A1 | 7/2010 | Ackermann et al. | |
| 2010/0200490 A1 | 8/2010 | Martin et al. | |
| 2010/0229513 A1 | 9/2010 | Eisengraeber-Pabst et al. | |
| 2010/0258493 A1 | 10/2010 | Kindkeppel et al. | |

(56) References Cited

U.S. PATENT DOCUMENTS

| | | |
|---|---|---|
| 2010/0263339 A1 | 10/2010 | Steins et al. |
| 2010/0294707 A1 | 11/2010 | Abdalla et al. |
| 2010/0294712 A1 | 11/2010 | Abdalla et al. |
| 2011/0089104 A1 | 4/2011 | Menez et al. |
| 2011/0132829 A1 | 6/2011 | Tucker et al. |
| 2011/0139699 A1 | 6/2011 | Tucker et al. |
| 2011/0197556 A1 | 8/2011 | Brown et al. |
| 2011/0203099 A1 | 8/2011 | Curt et al. |
| 2011/0260413 A1 | 10/2011 | Voltenburg et al. |
| 2011/0303604 A1 | 12/2011 | Mckenzie |
| 2012/0031059 A1 | 2/2012 | Haslebacher |
| 2012/0055127 A1 | 3/2012 | Holzmann et al. |
| 2012/0061307 A1 | 3/2012 | Kindkeppel et al. |
| 2012/0067013 A1 | 3/2012 | Antony et al. |
| 2012/0223008 A1 | 9/2012 | Mbadinga-Mouanda et al. |
| 2013/0015119 A1 | 1/2013 | Pugh et al. |
| 2013/0033006 A1 | 2/2013 | Salvador et al. |
| 2013/0087497 A1 | 4/2013 | Wells et al. |
| 2013/0220914 A1 | 8/2013 | Hawkins et al. |
| 2013/0291502 A1 | 11/2013 | Gorman |
| 2013/0327696 A1 | 12/2013 | Bagci et al. |
| 2014/0027366 A1 | 1/2014 | Hawkins et al. |
| 2014/0034565 A1 | 2/2014 | Loken et al. |
| 2014/0034566 A1 | 2/2014 | Verdegan et al. |
| 2014/0048468 A1 | 2/2014 | Kindkeppel et al. |
| 2014/0071669 A1 | 3/2014 | Mccarthy et al. |
| 2014/0096493 A1 | 4/2014 | Kelmartin et al. |
| 2014/0151275 A1 | 6/2014 | Bradford et al. |
| 2014/0190880 A1 | 7/2014 | Krull |
| 2014/0251895 A1 | 9/2014 | Wagner |
| 2014/0260143 A1 | 9/2014 | Kaiser |
| 2014/0290194 A1 | 10/2014 | Muenkel et al. |
| 2014/0318090 A1 | 10/2014 | Rieger et al. |
| 2014/0366494 A1 | 12/2014 | Ardes |
| 2015/0013288 A1 | 1/2015 | Hasenfratz et al. |
| 2015/0013289 A1 | 1/2015 | Hasenfratz et al. |
| 2015/0013293 A1 | 1/2015 | Wagner et al. |
| 2015/0033684 A1 | 2/2015 | Pettersson |
| 2015/0060351 A1 | 3/2015 | Kaufmann et al. |
| 2015/0061307 A1 | 3/2015 | Nakanishi |
| 2015/0090651 A1 | 4/2015 | Kotale et al. |
| 2015/0090656 A1 | 4/2015 | Mandt et al. |
| 2015/0096273 A1 | 4/2015 | Kaiser |
| 2015/0096932 A1 | 4/2015 | Hou et al. |
| 2015/0101295 A1 | 4/2015 | Thompson et al. |
| 2015/0107201 A1 | 4/2015 | Cornaglia |
| 2015/0176544 A1 | 6/2015 | Kaufmann et al. |
| 2015/0202556 A1 | 7/2015 | Hawkins et al. |
| 2015/0231532 A1 | 8/2015 | Pugh et al. |
| 2015/0285381 A1 | 10/2015 | Preston et al. |
| 2016/0023142 A1 | 1/2016 | Arakeri et al. |
| 2016/0045848 A1 | 2/2016 | Campbell et al. |
| 2016/0059172 A1 | 3/2016 | Allott et al. |
| 2016/0082372 A1 | 3/2016 | South et al. |
| 2016/0160816 A1 | 6/2016 | Venkatraman et al. |
| 2016/0169391 A1 | 6/2016 | Emig et al. |
| 2016/0220931 A1 | 8/2016 | Ardes |
| 2016/0222931 A1 | 8/2016 | Jiang et al. |
| 2016/0228798 A1 | 8/2016 | Page et al. |
| 2016/0258397 A1 | 9/2016 | Jiang et al. |
| 2016/0332098 A1 | 11/2016 | Chavan et al. |
| 2016/0332103 A1 | 11/2016 | Marks et al. |
| 2017/0014738 A1 | 1/2017 | Malgorn et al. |
| 2017/0078852 A1 | 3/2017 | Tan et al. |
| 2017/0120168 A1* | 5/2017 | Stamey, Jr. ............ B01D 29/21 |
| 2018/0318745 A1 | 11/2018 | Nichols et al. |
| 2020/0324237 A1 | 10/2020 | Moers et al. |
| 2021/0129049 A1 | 5/2021 | Yesane et al. |
| 2021/0275954 A1 | 9/2021 | Malgorn |
| 2022/0047971 A1 | 2/2022 | Abdalla et al. |
| 2022/0339560 A1 | 10/2022 | Glazewski et al. |
| 2022/0379245 A1 | 12/2022 | Oren et al. |
| 2023/0166208 A1 | 6/2023 | Decugniere |

FOREIGN PATENT DOCUMENTS

| | | |
|---|---|---|
| CN | 1193288 A | 9/1998 |
| CN | 2296402 Y | 11/1998 |
| CN | 1486213 A | 3/2004 |
| CN | 1590746 B | 3/2005 |
| CN | 2372041 Y | 4/2005 |
| CN | 1754612 A | 4/2006 |
| CN | 101084050 A | 12/2007 |
| CN | 101184544 B | 5/2008 |
| CN | 101374582 A | 2/2009 |
| CN | 201292900 Y | 8/2009 |
| CN | 101695616 A | 4/2010 |
| CN | 201696412 | 1/2011 |
| CN | 102046259 A | 5/2011 |
| CN | 102083510 A | 6/2011 |
| CN | 202040173 | 11/2011 |
| CN | 102271780 A | 12/2011 |
| CN | 202746046 U | 2/2013 |
| CN | 103501873 A | 1/2014 |
| CN | 103977647 A | 8/2014 |
| CN | 104220142 A | 12/2014 |
| CN | 105658944 A | 6/2016 |
| CN | 105688498 A | 6/2016 |
| CN | 105899271 | 8/2016 |
| CN | 106102858 A | 11/2016 |
| CN | 110382075 A | 10/2019 |
| CN | 110418675 B | 11/2019 |
| CN | 112334209 B | 2/2021 |
| CN | 112469487 B | 3/2021 |
| CN | 109890479 B | 11/2021 |
| CN | 109414639 B | 9/2022 |
| DE | 88 08 632 U1 | 9/1988 |
| DE | 29613098 U1 | 9/1996 |
| DE | 20 2004 014 559 U1 | 1/2005 |
| DE | 10 2008 062 956 A1 | 6/2010 |
| DE | 10 2014 102 794 B4 | 5/2018 |
| DE | 11 2018 000 343 T5 | 9/2019 |
| DE | 20 2020 104 741 U1 | 11/2020 |
| DE | 11 2019 003 046 T5 | 3/2021 |
| DE | 11 2006 001 365 B4 | 4/2021 |
| EP | 0 718 021 A1 | 6/1996 |
| EP | 0 747 579 A2 | 12/1996 |
| EP | 0 982 062 A2 | 3/2000 |
| EP | 1 129 760 A2 | 9/2001 |
| EP | 1 166 843 A1 | 1/2002 |
| EP | 1 208 902 A1 | 5/2002 |
| EP | 1 233 173 A2 | 8/2002 |
| EP | 1 693 096 A2 | 8/2006 |
| EP | 1 693 096 B1 | 8/2006 |
| EP | 1 747 053 A1 | 1/2007 |
| EP | 3 528 920 A1 | 8/2019 |
| EP | 4 122 576 A1 | 1/2023 |
| FR | 2214505 A1 | 8/1974 |
| FR | 3018202 B1 | 12/2017 |
| FR | 3057177 | 4/2022 |
| GB | 0 970 826 A | 9/1964 |
| GB | 2 082 932 A | 3/1982 |
| GB | 2 404 348 A | 2/2005 |
| JP | 60-112320 A | 6/1985 |
| JP | 01-163408 A | 6/1989 |
| JP | 01-171615 A | 7/1989 |
| JP | 02-025009 A | 1/1990 |
| MX | 2019010714 A | 2/2019 |
| MX | 2019008240 A | 9/2019 |
| MX | 2020013448 A | 2/2021 |
| WO | WO-97/16235 | 5/1997 |
| WO | WO-00/50152 A1 | 8/2000 |
| WO | WO-00/74818 A1 | 12/2000 |
| WO | WO-01/05485 A1 | 1/2001 |
| WO | WO-2004/054684 A1 | 7/2004 |
| WO | WO-2005/058461 A1 | 6/2005 |
| WO | WO-2005/077487 A1 | 8/2005 |
| WO | WO-2006/093981 A2 | 9/2006 |
| WO | WO-2007/009039 A1 | 1/2007 |
| WO | WO-2007/089662 A2 | 8/2007 |
| WO | WO-2012/153430 A1 | 11/2012 |
| WO | WO-2014/111162 A1 | 7/2014 |
| WO | WO-2017/079191 A1 | 5/2017 |

(56)                References Cited

FOREIGN PATENT DOCUMENTS

| WO | WO-2017/120113 | A1 | 7/2017 |
| WO | WO-2017/180875 | A1 | 10/2017 |
| WO | WO-2018/075063 | A1 | 4/2018 |
| WO | WO-2018/156489 | A1 | 8/2018 |
| WO | WO-2018/175438 | A1 | 9/2018 |
| WO | WO-2022/150130 |  | 7/2022 |

OTHER PUBLICATIONS

Examination Report issued for European Patent Application No. 22196095.8 issued Sep. 20, 2024, 3 pages.
Non-Final Office Action issued for U.S. Appl. No. 18/196,550 issued Sep. 12, 2024, 63 pages.
Akro-Mils, "Nest & Stack Totes," retrieved from http://web.archive.org/web/20150323114331/https://akro-mils.com/produts/types/plastic-storage-containers/nest-stack-totes, 1 page (2015).
CN Decision of Rejection on CN 201880012627.5 DTD Apr. 12, 2022.
Final Office Action on U.S. Appl. No. 16/487,209 DTD Jun. 20, 2022.
Final Office Action on U.S. Appl. No. 16/487,209 DTD Aug. 23, 2021.
First Examination Report for Indian Patent App. No. 202047056950 dated Mar. 24, 2021, 5 pages.
First Examination Report for Indian Patent App. No. 3035/KOLNP/2011, dated Feb. 8, 2019, 7 pages.
First Office Action for Chinese Patent App. No. 201080004417.5, dated May 24, 2013, 13 pages (with translation).
First Office Action for Chinese Patent App. No. 2016800710703 dated Nov. 26, 2019, 29 pages (with translation).
First Office Action for Chinese Patent App. No. 201880012627.5 dated Dec. 28, 2020, 22 pages (with English translation).
First Office Action for Chinese Patent Application No. 201880007980.4 dated Jan. 12, 2021, 15 pages (with English translation).
First Office Action issued for Chinese Patent App. No. 201880018033.5 issued Dec. 24, 2020, 10 pages (with English translation).
First Office Action issued for Chinese Patent Application No. CN 201980048336.6 issued Oct. 29, 2021, 9 pages.
Second Office Action issued for Chinese Patent Application No. CN 201880012627.5 DTD Jun. 17, 2021.
International Search Report & Written Opinion for PCT/US2010/024765 dated Apr. 7, 2010, 9 pages.
International Search Report & Written Opinion for PCT/US2018/014401 dated May 15, 2018, 9 pages.
International Search Report & Written Opinion for PCT/US2018/018724 dated Apr. 24, 2018, 13 pages.
International Search Report and Written Opinion for PCT/IB2019/056208 dated Nov. 11, 2019, 8 pages.
International Search Report and Written Opinion for PCT/US2016/063053, dated Feb. 16, 2017, 8 pages.
International Search Report and Written Opinion for PCT/US2017/021615, dated Jun. 6, 2017, 8 pages.
International Search Report and Written Opinion for PCT/US2017/030386, dated Jul. 26, 2017, 9 pages.
International Search Report and Written Opinion for PCT/US2018/018696, dated Apr. 19, 2018, 8 pages.
International Search Report and Written Opinion issued for PCT Application No. PCT/US2021/017197 issued Jun. 25, 2021, 16 pages.
Non-Final Office Action for U.S. Appl. No. 16/478,092, dated Jul. 30, 2021.
Non-Final Office Action on U.S. Appl. No. 16/487,209 DTD Jan. 24, 2022.
Non-Final Office Action on U.S. Appl. No. 16/487,209 DTD May 28, 2021.
Non-Final Office Action on U.S. Appl. No. 16/493,511 DTD Jul. 1, 2021.
Notice of Allowance on U.S. Appl. No. 16/083,945 DTD Jul. 8, 2021.
Office Action for German Patent App. No. 11 2010 001 567.8 dated May 18, 2017, 12 pages.
Office Action issued for Chinese Patent Application No. CN 201880007980.4 issued Jul. 9, 2021, 7 pages.
Office Action on CN 201880012627.5 DTD Oct. 25, 2021 (4 pages) (no English Translation).
Second Office Action for Chinese Patent App. No. 201080004417.5, dated Mar. 5, 2014, 28 pages (with translation).
First Office Action issued for Chinese Patent Application No. 202180013535.0 issued Feb. 7, 2024, 9 pages.
Non-Final Office Action on U.S. Appl. No. 17/260,628 DTD Mar. 25, 2024.
Non-Final Office Action on U.S. Appl. No. 17/474,306 DTD Oct. 6, 2022.
Non-Final Office Action on U.S. Appl. No. 17/516,431 DTD Feb. 7, 2023.
Notice of Allowance on U.S. Appl. No. 17/474,306 DTD Feb. 1, 2023.
Notice of Allowance on U.S. Appl. No. 17/516,431 DTD Jul. 12, 2023.
Extended European Search Report issued for European Patent Application No. EP 22196095.8 issued Dec. 13, 2022, 7 pages.
Third Office Action issued for Chinese Patent No. 201980048336.6 issued Nov. 3, 2022, 10 pages.

* cited by examiner

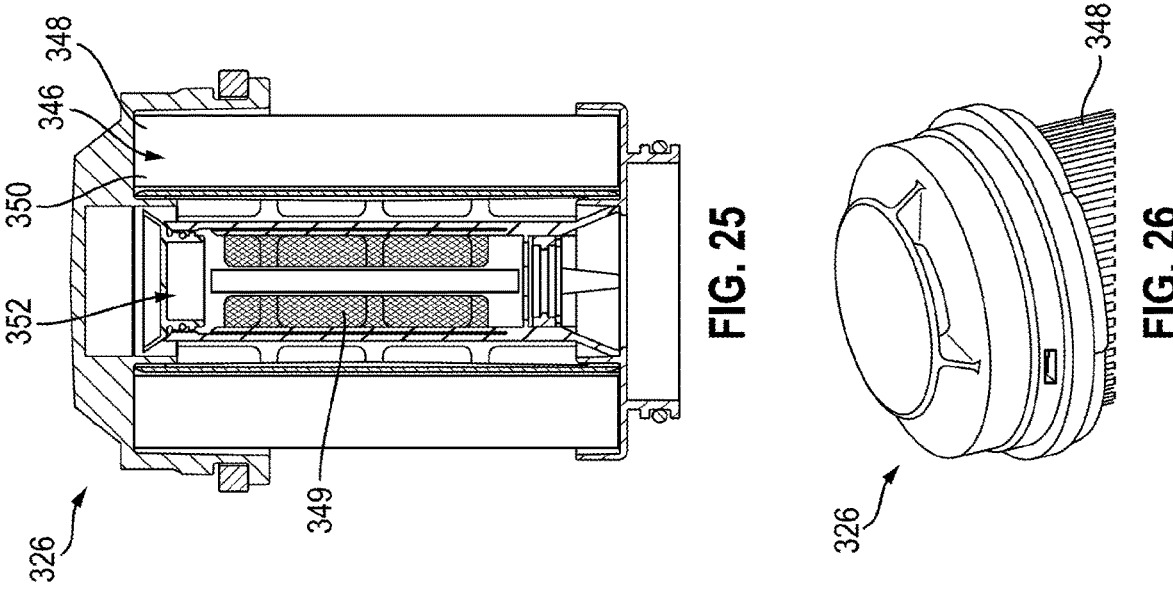
FIG. 25
FIG. 26
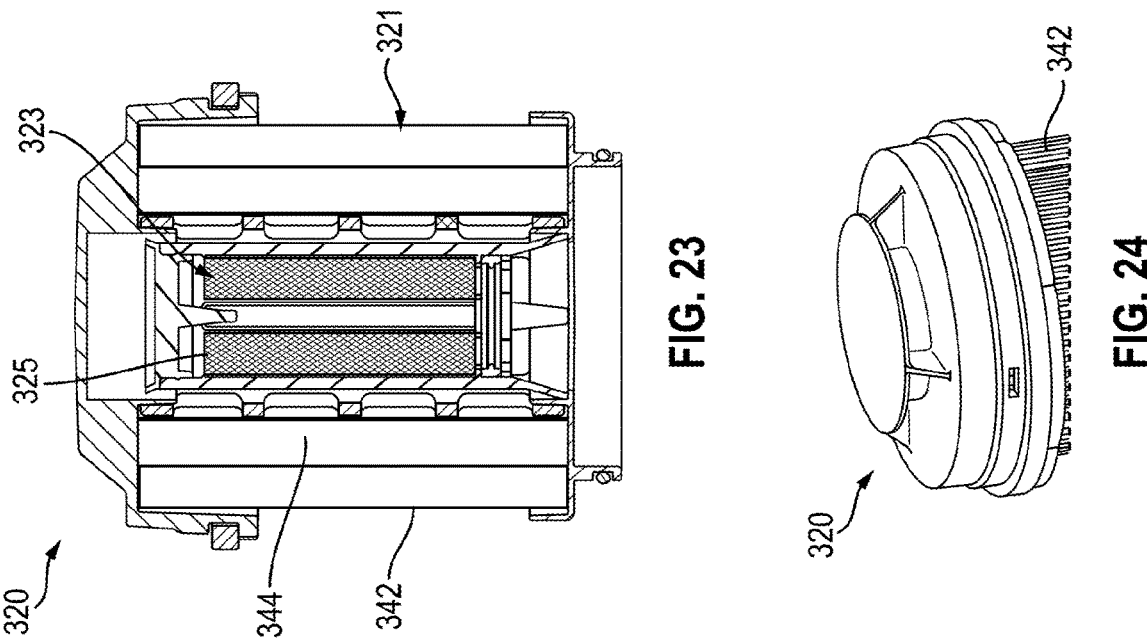
FIG. 23
FIG. 24

328

308

329

328

Outlet

ADVANCED FUEL FILTRATION SYSTEM WITH INTERLOCKING CARTRIDGE SEAL DESIGN

CROSS-REFERENCE TO RELATED PATENT APPLICATIONS

The present application is a continuation of PCT Application No. PCT/US2021/017197, filed Feb. 9, 2021, which claims the benefit of and priority to Indian Provisional Patent Application No. 202041005898, filed Feb. 11, 2020. The contents of these applications are incorporated by reference in their entireties.

TECHNICAL FIELD

The present disclosure relates generally to filters for use with internal combustion engine systems.

BACKGROUND

Internal combustion engine systems require fuel (e.g., diesel fuel, gasoline, etc.) to operate. The fuel may be contaminated with water and/or particulate matter, which may damage various parts of the engine system if not removed from the fluid. To remove water and other contaminants, the fuel is generally passed through a filter assembly, which may include a particulate filter and/or fuel-water separator.

SUMMARY

One embodiment of the present disclosure relates to a filter assembly including a filter element and a filter housing. The filter housing includes a shell defining an inner cavity, and a lid configured to engage the shell at an opening of the inner cavity. The filter element is disposed within the inner cavity and includes a media pack having a media pack first end and a media pack second end, a first endplate, and a sealing member. The first endplate is sealingly engaged with the media pack first end and includes a skirt extending along a longitudinal axis of the media pack from the media pack first end toward the media pack second end. The sealing member is coupled to the skirt and is positioned between and forms a seal between the lid and the shell. The filter element may include a plurality of media packs. For example, the filter element may include an outer media pack defining a central cavity, and an inner media pack disposed within the central cavity.

Another embodiment of the present disclosure relates to a filter element. The filter element includes a media pack having a media pack first end and a media pack second end, a first endplate, and a sealing member. The first endplate is sealingly engaged with a first end of the filter element and includes a skirt extending along a longitudinal axis of the media pack from the media pack first end toward the media pack second end. The sealing member is coupled to the skirt and circumferentially surrounds the media pack. The sealing member protrudes beyond an outer perimeter of the first endplate. The filter element may include a plurality of media packs. For example, the filter element may include an outer media pack defining a central cavity, and an inner media pack disposed within the central cavity.

Still another embodiment of the present disclosure relates to a filter assembly. The filter assembly includes a filter housing and a filter element. The filter housing includes a shell defining an inner cavity, a lid configured to engage the shell at an opening of the inner cavity, and a drain valve that fluidly couples the inner cavity to an environment surrounding the shell. The filter element is disposed within the inner cavity. The filter element includes an outer media pack defining a central cavity, an inner media pack disposed within the central cavity, and an endplate sealingly engaged with both the outer media pack and the inner media pack. The endplate defines an opening that is positioned between the inner media pack and the outer media pack. The opening is fluidly coupled to the drain valve.

Yet another embodiment of the present disclosure relates to a filter assembly. The filter assembly includes a first stage filter media pack, and a second stage filter media pack downstream from the first stage filter media pack. The second stage filter media pack includes a coalescing pleated media and a stripping media.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 23 is a side cross-sectional view of a first filter element of the two stage filter assembly of FIG. 18.

FIG. 24 is perspective view of an endplate portion of the first filter element of FIG. 23.

FIG. 25 is a side cross-sectional view of a second filter element of the two stage filter assembly of FIG. 18.

FIG. 26 is a perspective view of an endplate portion of the second filter element of FIG. 25.

Figures 1, 2:
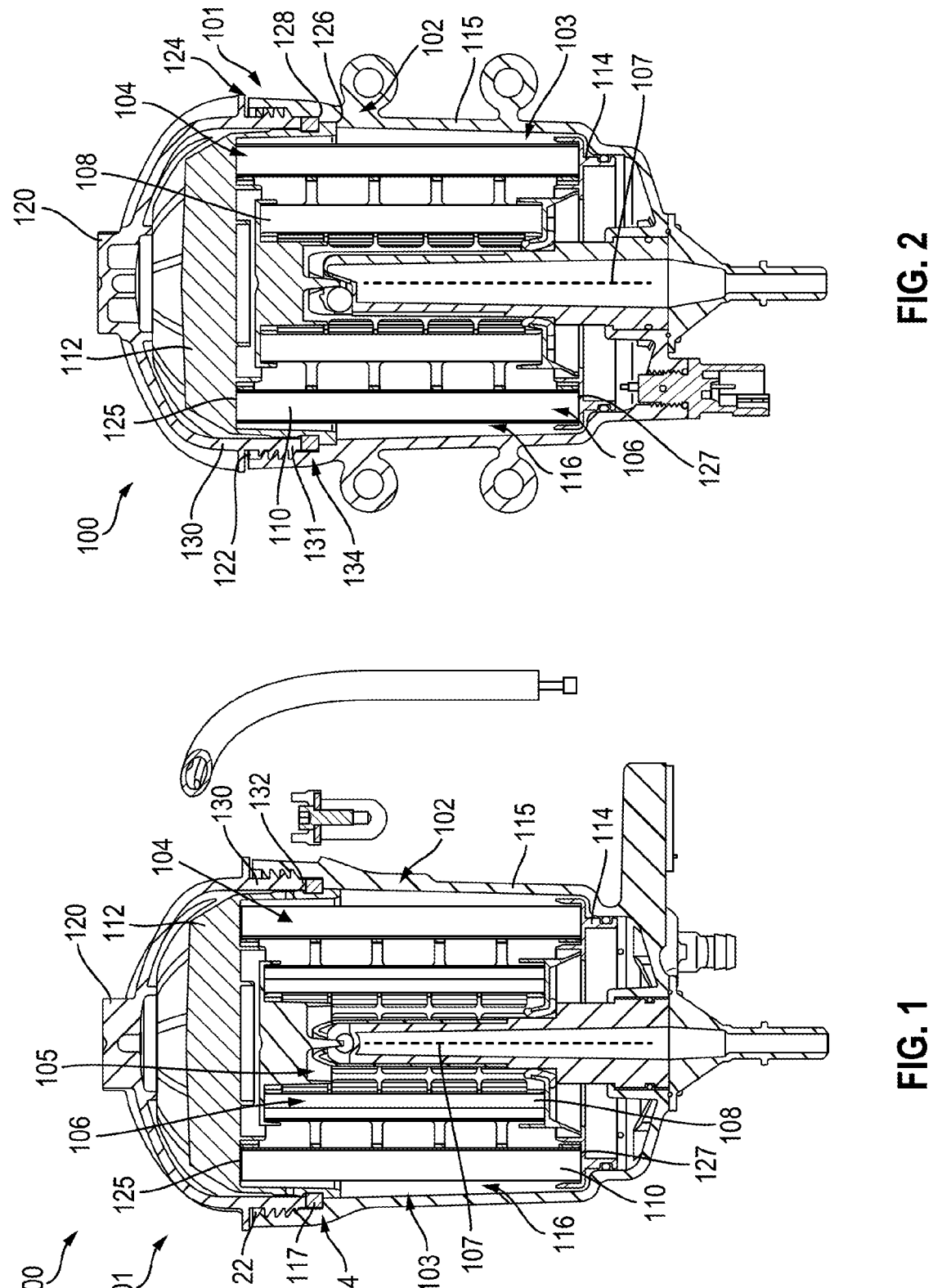
FIG. 1 is a side cross-sectional view of a filter assembly, according to an embodiment.
FIG. 2 is another side cross-sectional view of the filter assembly of FIG. 1.
Figure 4:
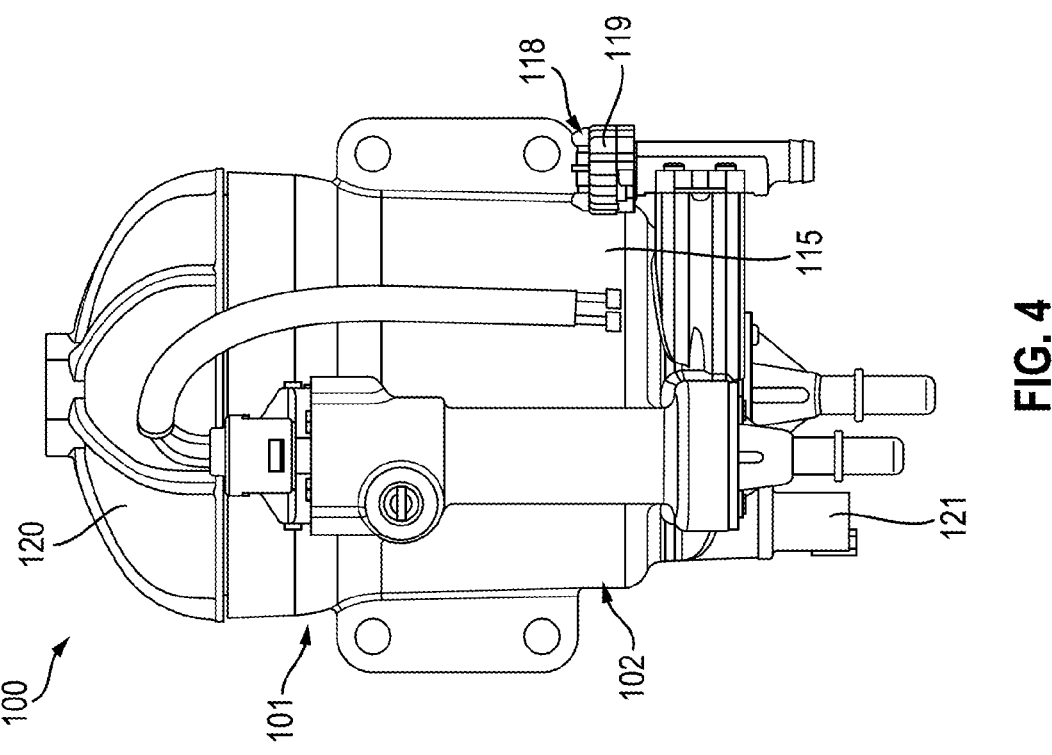
FIG. 4 is a side view of the filter assembly of FIG. 1.
Figure 3:
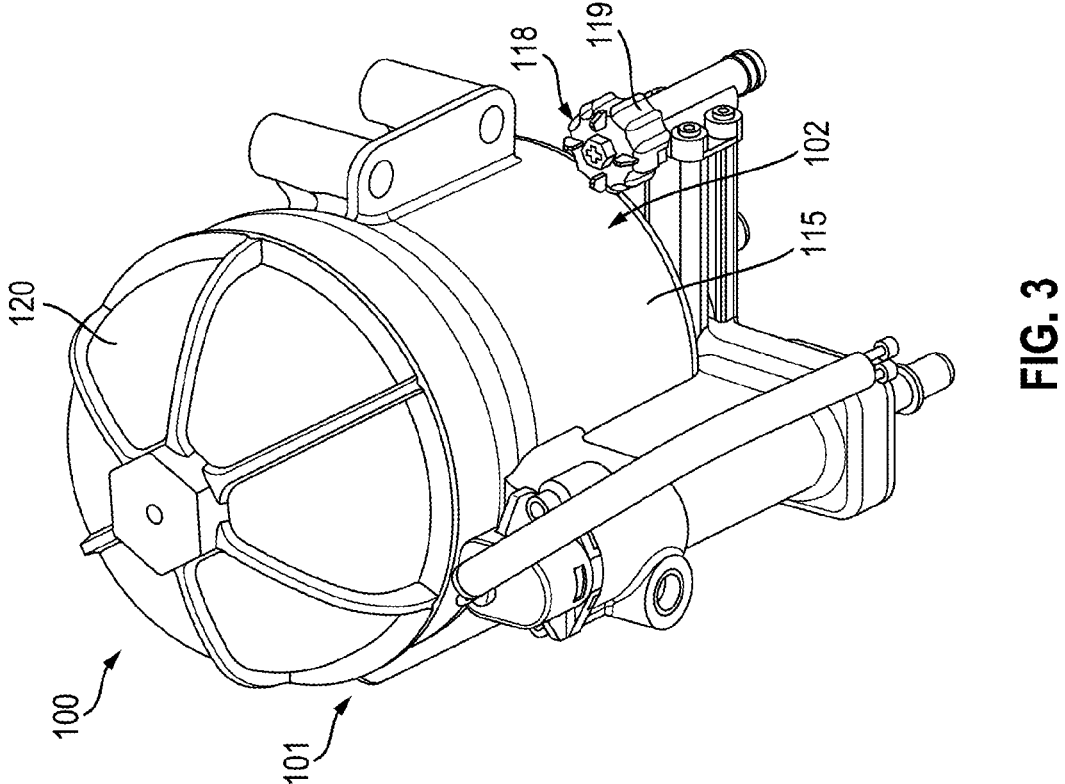
FIG. 3 is a perspective view of the filter assembly of FIG. 1.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to diesel fuel filtration systems. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engine systems require a clean source of fluids (e.g., fuel, oil, etc.) to power and lubricate the engine. Unfiltered fluids may include dirt, metal particles, and other solid contaminants that can damage engine components (e.g., fuel injectors, cylinder rings, pistons, etc.). In order to protect the engine components, the internal combustion engine systems may include a filtration system, which filters incoming and/or recirculating fluids to remove any solid materials before passing the fluids to the engine. In some instances, the filtration system includes a filter housing and a replaceable filter cartridge, which may be periodically replaced by an operator and/or technician to maintain the differential pressure across the filtration system to within reasonable levels.

A replaceable filter cartridge may include various components to facilitate engagement and sealing of the filter cartridge within a filter housing. For example, the filter cartridge may include an gasket (such as an O-ring) or another form of sealing member that engages with the housing to prevent fluid bypass between the clean and dirty sides of the filter cartridge. The filtration system also includes a sealing member between the lid and body of the housing that prevents fluid leakage into an environment surrounding the filtration system (e.g., the engine compartment, etc.). The design of this sealing interface, between the lid and body of the housing, affects the maximum fluid pressure that can be achieved through the filtration system before fluid leakage from the housing occurs.

Modern fuel injection systems typically require increased fuel supply pressures than previous generations. Additionally, the fuel cleanliness requirements in modern fuel injection systems may require multiple stages of fuel filtration to ensure more complete removal of water and particulate contamination from the fuel before the fuel reaches the engine. However, the use of multiple stages of filtration generally requires multiple independent fuel filter assemblies, which can increase the overall space envelope required by the fuel filtration system.

Referring to the figures generally, a fuel filtration system for a diesel engine system is shown. The fuel filtration system includes a replaceable filter element cartridge having a sealing interface designed to reduce the number of sealing members (e.g., O-rings, gaskets, etc.) used in the filtration system and increase the reliability and maximum operating pressure of the filtration system. The filter element includes a media pack and a first endplate that is sealingly engaged with the media pack. The first endplate includes a skirt that extends along a longitudinal axis of the media pack between opposing axial ends of the media pack. The filter element also includes a sealing member that provides sealing between both (i) the filter element and the filter housing, and (ii) the lid and shell (e.g., body, etc.) of the housing. The sealing member is coupled to the skirt and extends in a radial direction from the skirt toward the housing. The sealing member is "sandwiched" or otherwise disposed between the lid and the shell. In other words, the sealing member is secured in place by the compressive force between the lid and the shell, which increases the overall reliability of the sealing interface and the maximum allowable fuel pressure within the filter housing.

In at least one embodiment, the filter element includes multiple media packs including an outer media pack defining a central cavity and an inner media pack disposed within the central cavity. The inner media pack includes a stripping media to facilitate water separation from the incoming fuel. The filter element includes a second endplate that is sealingly engaged with both the outer media pack and the inner media pack. Among other benefits, the structure of the second endplate allows water separation to occur through the space between the outer media pack and the inner media pack. In particular, the second endplate defines an opening positioned between the inner media pack and the outer media pack to allow separated water to escape from between the inner and outer media packs to a drain valve disposed at a lower end of the filter housing.

In at least one embodiment, the fuel filtration system is a two stage fuel filtration system that includes two replaceable filter element cartridges. The fuel filtration system includes a single filter housing to receive the filter cartridges and thereby reduce the overall footprint of the fuel filtration system (as compared to conventional two stage filtration systems with multiple independent fuel filter housings). In at least one embodiment, the two stage fuel filtration system includes a first stage filter media pack and a second stage filter media pack disposed downstream from the first stage filter media pack. The second stage filter media pack includes a coalescing pleated media and a stripping media to enhance water separation from the incoming fuel.

II. Example Fuel Filtration System

FIGS. 1-5 show a high pressure fluid filtration system, shown as filtration system 100, according to an embodiment. The filtration system 100 may be used to filter a fluid provided to an internal combustion engine. The fluid may be a fuel, an engine oil, a hydraulic oil, or another lubricant. In the example embodiment of FIGS. 1-5, the filtration system 100 is a fuel filtration system for a diesel engine that uses diesel fuel to drive the combustion process. The filtration system 100 is configured to be mounted on the diesel engine but may be mounted remotely from the diesel engine in various example embodiments. As shown in FIGS. 1-2, the filtration system 100 includes a filter assembly 101 that includes a filter housing 102 and a filter element assembly 103. The filter element assembly 103 includes an outer filter element 104 (e.g., cartridge, etc.) disposed within the filter housing 102, and an inner filter element 106 (e.g., a secondary filter element, secondary cartridge, etc.) surrounded by and/or nested within the outer filter element 104 (e.g., a filter in filter design). Each of the outer filter element 104 and the inner filter element 106 include a media pack, shown as inner media pack 108 and outer media pack 110 (e.g., pleated filtration media, etc.) arranged as a cylindrical tube that circumscribes a central cavity 105 having a longitudinal axis 107. The outer media pack 110 and the inner media pack 108 each include filter media structured to filter particulate matter and water from fuel flowing therethrough so as to produce filtered fluid (e.g., clean fluid). The filter media may include porous material having a predetermined pore size. The filter media may include a paper-based filter media, a fiber-based filter media, or the like. In an embodiment, at least one filter element (e.g., a stage 1 filter element, the outer filter element 104, a stage 2 filter element, the inner filter element 106) is a fuel-water separator containing coalescing pleated media and stripping media to achieve optimal water/particle removal and engine protection. At least one of the filter elements may include an integrated coalescing wrap and hydrophobic screen.

In the example embodiment of FIGS. 1-2, the outer filter element 104 and the inner filter element 106 are each arranged as an outside-in flow filter element having an outer dirty side and an inner clean side. Fluid to be filtered passes from the dirty side of the outer filter element 104 to an annular space in between the outer filter element 104 and the inner filter element 106, and from the annular space to the clean side of the inner filter element 106. In one embodiment, the outer filter element 104 and the inner filter element 106 are affixed to one another by at least one endplate, shown as first endplate 112 (e.g., first endcap, upper endplate, upper endcap, etc.) to form a unitary body. As shown in FIGS. 1-2, the outer filter element 104 and the inner filter element 106 are also affixed to one another by a second endplate 114 (e.g., lower endplate, etc.). The first endplate 112 and the second endplate 114 are coupled to opposing axial ends of a media pack for each of the outer filter element 104 and the inner filter element 106 (e.g., the outer media pack 110 and the inner media pack 108). In particular, the first endplate 112 of the filter element assembly 103 is sealingly engaged with an outer media pack first end 125 (e.g., a first axial end) of the outer media pack 110, and a second endplate 114 (e.g., bottom endplate) is sealingly engaged with an outer media pack second end 127 (e.g., a second axial end) of the outer media pack 110 opposite the outer media pack first end 125. The first endplate 112 and the second endplate 114 are also sealingly engaged with opposing axial ends of the inner media pack 108.

As shown in FIGS. 1-5, the filter housing 102 includes a shell 115, canister, and/or body defining an inner cavity 116 that is configured to receive the inner filter element 106 and the outer filter element 104 therein. As shown in FIGS. 1-2, the filter housing 102 also includes a lid 120 (e.g., spin-on lid, etc.), cover, and/or cap that is configured to engage with (e.g., threadably engage, etc.) the shell 115 at an opening 122 to the inner cavity 116. The filter housing 102 and the lid 120 may be made from the same or different materials. For example, the filter housing 102 may be made (e.g., cast or otherwise formed) from an aluminum material or another suitable material. The lid 120 may be made (e.g., injection molded or otherwise formed) from a plastic material or another suitable material.

As shown in FIG. 2, the shell 115 defines a cylindrical inner cavity, shown as inner cavity 116, with a substantially circular cross-section. An upper end 124 of the shell 115 defines the opening 122 to the inner cavity 116. The shell 115 includes a lower housing ledge 126 (e.g., shelf, step, etc.) positioned circumferentially about the upper end 124 of the shell 115 and extending radially into the inner cavity 116. The shell 115 also includes an upper housing ledge 128 disposed between the lower housing ledge 126 and a threaded portion of the shell 115 at the upper end 124. An upper surface of each one of the lower housing ledge 126 and the upper housing ledge 128 are arranged in a substantially perpendicular relative to the sidewall of the shell 115 (e.g., substantially horizontal as shown in FIG. 2).

The lid 120 includes a cup-shaped upper portion and a cylindrical axial sidewall, shown as axial sidewall 130, extending downwardly from the upper portion. As shown in FIGS. 1-2, a lower portion 132 (e.g., flange, threaded cylindrical extension, etc.) of the axial sidewall 130 is configured to be received within the inner cavity 116 when the lid 120 is installed onto the shell 115 and to threadably engage the shell 115.

Figure 6:
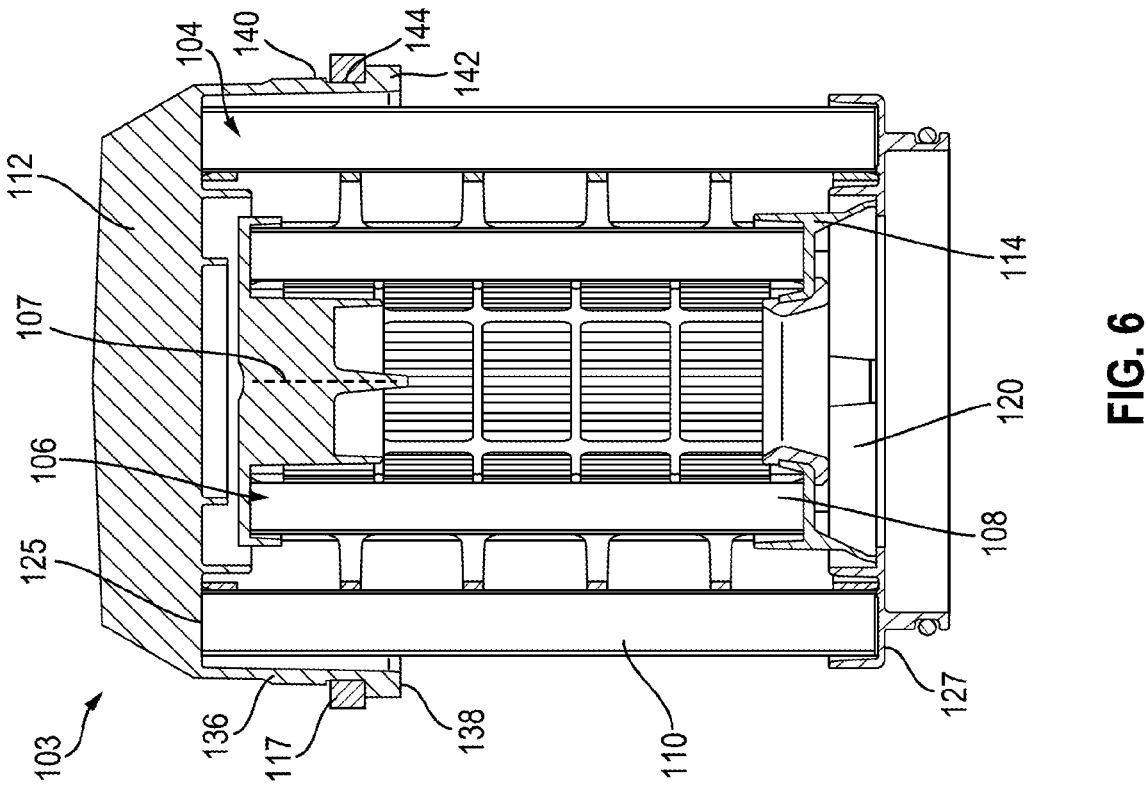
FIG. 6 is a side cross-sectional view of the filter assembly of FIG. 1.
Figure 5:
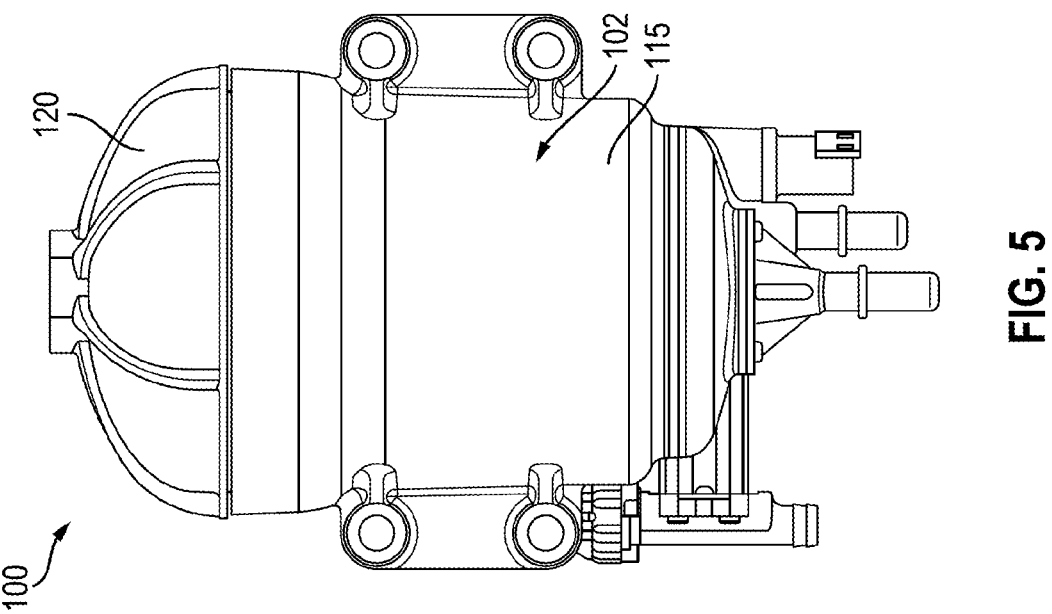
FIG. 5 is another side view of the filter assembly of FIG. 1.

In the embodiment shown in FIGS. 1-5, the inner cavity 116 is sealed from an environment surrounding the filter housing 102 by the lid 120, shell 115, and by an undulating interlocking seal mechanism, shown as interlocking seal mechanism 134, that is formed at least partially by the first endplate 112 at an interface between the replaceable filter element cartridge, the lid 120, and the shell 115. FIG. 6 shows the filter element assembly 103 from the filtration system 100 of FIGS. 1-5. As shown, the first endplate 112 of the filter element assembly 103 includes a skirt 136 extending radially away from an outer perimeter of the outer media pack first end 125 and axially (e.g., parallel to the longitudinal axis 107 of the outer media pack 110) from the outer media pack first end 125 toward the outer media pack second end 127. A lower end 138 of the skirt 136 is disposed at an intermediate position between the outer media pack first end 125 and the outer media pack second end 127. The first endplate 112 further includes a sealing member 117 (e.g., o-ring, gasket, etc.) coupled to the skirt 136 proximate to the lower end 138 of the skirt 136. The sealing member 117 protrudes outwardly (e.g., radially outwardly) away from an outer perimeter of the skirt 136.

Figure 7:
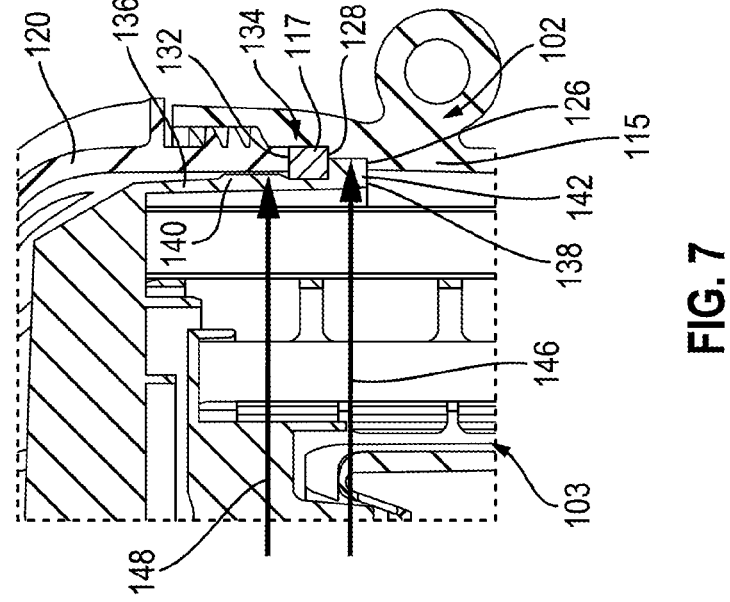
FIG. 7 is a side cross-sectional view of an upper sealing interface portion of the filter assembly of FIG. 1.

As shown in FIG. 6, the lower end 138 of skirt 136 is spaced radially apart from an outer perimeter of the outer media pack 110 such that the skirt 136 circumferentially surrounds the outer media pack first end 125 of the outer media pack 110. The lower end 138 of the skirt 136 includes a first protrusion 140 and a second protrusion 142 spaced axially apart from the first protrusion 140. The first protrusion 140 and the second protrusion 142 together define a recessed area 144 sized to receive the sealing member 117 therein. In at least one embodiment, the skirt 136 only includes one of the first protrusion 140 or the second protrusion 142 (e.g., only the second protrusion 142). As shown in FIG. 7, an outer radius 146 of the second protrusion 142 is greater than an outer radius 148 of the first protrusion 140, which helps support the sealing member 117 at the lower end 138 and prevents the sealing member 117 from being pulled down toward the open end of the skirt 136. The interaction between the second protrusion 142 and the shell 115 also prevents the sealing member 117 from becoming disconnected from the skirt 136 when the filter element assembly 103 is installed into the shell 115 as will be further described.

FIG. 7 shows the interlocking seal mechanism 134 of the filtration system 100 of FIGS. 1-5. As shown, the sealing member 117 is "sandwiched" or otherwise disposed or positioned between the lid 120 and the shell 115, forming a seal between the lid 120 and the shell 115, thereby preventing fuel from escaping the filter housing 102. An upper end (e.g., upper axial end surface) of the sealing member 117 is sealingly engaged with a lower surface of the lid 120, and a lower end (e.g., lower axial end surface) of the sealing member 117 (opposite the upper end) is sealingly engaged with the shell 115. More specifically, the lower end of the sealing member 117 is sealingly engaged with the upper housing ledge 128 of the shell 115. Among other benefits, the compressive force between the lid 120 and the shell 115 prevents movement of the sealing member 117 when the lid 120 is installed onto the shell 115, even under high fuel pressures and flow rates through the filter housing 102 (e.g., up to approximately 7 bar, 7.3 bar, or greater at flow rates of 4.0 L/min, 5.3 L/min, or greater).

As shown in FIG. 7, an upper surface of the second protrusion 142 is generally flush with an upper surface of the upper housing ledge 128 such that the lower end of the sealing member 117 is also sealingly engaged with the upper surfaces of both the second protrusion 142 and the upper housing ledge 128. An axial height of the second protrusion 142 is approximately the same as an axial spacing between the upper housing ledge 128 and the lower housing ledge 126. As such, a lower end of the second protrusion 142 (e.g., the lower end 138 of the skirt 136) is engaged with the lower housing ledge 126, which prevents over-insertion of the filter element assembly 103 into the filter housing 102 and helps center the filter element assembly 103 with respect to the filter housing 102. Engagement between the second protrusion 142 and the lower housing ledge 126 also prevents separation of the sealing member 117 from the skirt 136 when the filter element assembly 103 is installed into the filter housing 102 (e.g., due to the upward force applied to the sealing member 117 by the upper housing ledge 128). As shown in FIG. 7, the lower portion 132 of the axial sidewall 130 of the lid 120 is disposed at an intermediate radial position between the second protrusion 142 and the upper housing ledge 128, such that the sealing member 117 is compressed between (i) the lid 120 and (ii) both the second protrusion 142 and the upper housing ledge 128. Among other benefits, the interlocking seal mechanism 134 reduces the risk of fluid leakage from the inner cavity 116, and increases the maximum fluid pressure that can be maintained within the filter housing 102.

Figure 8:
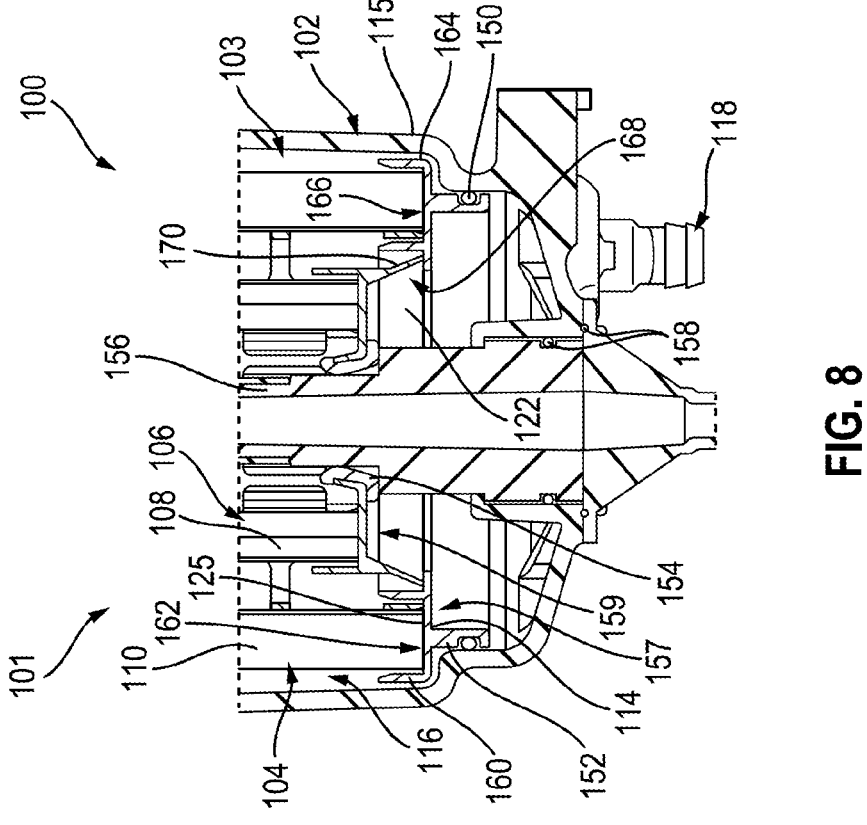
FIG. 8 is a side cross-sectional view of a lower sealing interface portion of the filter assembly of FIG. 1.

FIG. 8 shows a lower sealing interface between the filter element assembly 103 and the filter housing 102. The second endplate 114 includes a bottom section sealing member, shown as second sealing member 150 (e.g., o-ring, gasket, etc.), that separates the dirty and clean sides of the filter element assembly 103 at a lower end of the filter housing

102. In the embodiment of FIG. 8, the second endplate 114 separates the dirty and clean sides of the outer filter element 104. As shown, the second endplate 114 is shared between the outer filter element 104 and the inner filter element 106. The second sealing member 150 is coupled to the second endplate 114, to an axial sidewall 152 (e.g., cylindrical extension, etc.) that extends axially away from the outer filter element 104, and forms a radial seal between the second endplate 114 and an interior surface of the shell 115 (proximate a lower end of the inner cavity 116 opposite the opening 122 of the shell 115). In some embodiments, the second endplate 114 also includes a pressure bleed port, valve, etc. to prevent damage to the filter element assembly 103 due to high differential pressure (e.g., blockage of the media pack, etc.).

The second endplate 114 also includes a third sealing member 154 (e.g., o-ring, sump gasket sealing member, etc.) that separates the dirty and clean sides of the inner filter element 106. As shown in FIG. 8, the third sealing member 154 is coupled to the second endplate 114 proximate to an inner perimeter of the second endplate 114. The third sealing member 154 is disposed radially between the inner perimeter of the second endplate 114 and a standpipe 156 of the filter assembly 101, and sealingly engages the standpipe 156.

As shown in FIG. 8, the standpipe 156 forms part of a standpipe assembly that is configured to fluidly couple the clean side of the filter element assembly 103 to other components of the filtration system 100 and/or engine. The standpipe 156 is coupled to a lower end of the filter housing 102 and extends axially into the inner cavity 116. The standpipe assembly includes sealing members 158 (e.g., o-rings, gaskets, etc.) that sealingly engage with the filter housing 102 to prevent fluid leading from the inner cavity 116. As shown in FIG. 8, the sealing members 158 are disposed proximate to a lower end of the standpipe 156, radially between the standpipe 156 and the shell 115, and on a lower exterior wall of the shell 115.

Returning to FIGS. 3-4, the filter assembly 101 may also include a drain valve assembly 118 including a drain valve 119 (e.g., a common integrated drain valve, solenoid valve, etc.) that allows for water to flow/drain from a first filtration stage (e.g., stage 1, outer filter element 104) and a second filtration stage (e.g., stage 2, inner filter element 106) while, simultaneously, allowing air to flow back in through the same port/bore. Among other benefits, this allows fluid to drain through the drain valve 119 under the force of gravity and in the absence of fuel pressure through the filter assembly 101. In at least one embodiment, the drain valve assembly 118 may be included in only one of the first filtration stage or the second filtration stage. In the embodiment of FIG. 8, the drain valve assembly 118 includes a drain line (see FIGS. 3-4) that fluidly couples a lower portion of the inner cavity 116, below the second endplate 114 (see FIG. 1), to the drain valve 119. The drain line also fluidly couples lower end of an outer annular portion of the inner cavity 116 to the drain valve 119. The filter assembly 101 also includes a water-in-fuel sensor 121 to control operation of the drain valve 119 when water is detected in the inner cavity 116 (e.g., to selectively open the drain valve 119 when water is detected, to drain the water from the inner cavity 116).

As shown in FIG. 8, the second endplate 114 defines at least one opening 122, positioned between the inner media pack 108 and the outer media pack 110, and that fluidly couples a space between the inner media pack 108 and the outer media pack 110 with the lower portion of the inner cavity 116 and drain valve assembly 118. The second endplate 114 includes a first portion 157 (e.g., outer portion) supporting the outer media pack 110 and a second portion 159 (e.g., inner portion) supporting the inner media pack 108. The first portion 157 includes a first pair of sidewalls 160 defining a first channel 162 that is sized to receive the outer media pack first end 125 therein. Similarly, the second portion 159 includes a second pair of sidewalls 164 defining a second channel 166 that is sized to receive an axial end of the inner media pack 108 therein. The outer media pack 110 and the inner media pack 108 are coupled to the second endplate 114 via a potting operating using an adhesive or curable urethane material that is disposed in the first channel 162 and the second channel 166, respectively.

As shown in FIG. 8, the second endplate 114 also includes a perforated extension 168 that extends between the first portion 157 and the second portion 159. The perforated extension 168 includes a plurality of legs 170 (e.g., supports, etc.) that extend at an angle between the first portion 157 and the second portion 159. A first (e.g., lower) end of each leg engages a flange that extends radially inward from the first portion 157 toward the second portion 159. A second (e.g., upper) end of each leg is coupled to a lower surface of the second portion 159. The legs 170 extend at least partially radially away from the first portion 157 and axially upwardly from the first portion 157 toward the second portion 159. In other embodiments, the shape, size, number, and/or position of the legs 170 may be different. In at least one embodiment, the legs 170 are integrally formed with the second portion 159 of the second endplate 114 as a unitary body such that the legs 170 cannot be separated from the second portion 159 without breaking the legs 170. In another embodiment, the legs 170 are integrally formed with the first portion 157. In the embodiment of FIG. 8, the legs 170 are not affixed to the first portion 157, but engage the flange to prevent axial movement of the inner media pack 108 with respect to the outer media pack 110. Among other benefits, separating the first portion 157 from the second portion 159 by the legs 170 facilitates assembly of the filter element assembly 103 because this structure allows the first portion 157 to be installed separately from the second portion 159. In other embodiments, the structure of the perforated extension 168 may be different. For example, the perforated extension 168 may include a conical plate that extends along the entire perimeter of the first portion 157 and the second portion 159. The plate may include a plurality of openings to allow water to drain from the annular gap between the inner media pack 108 and the outer media pack 110.

Figure 9:
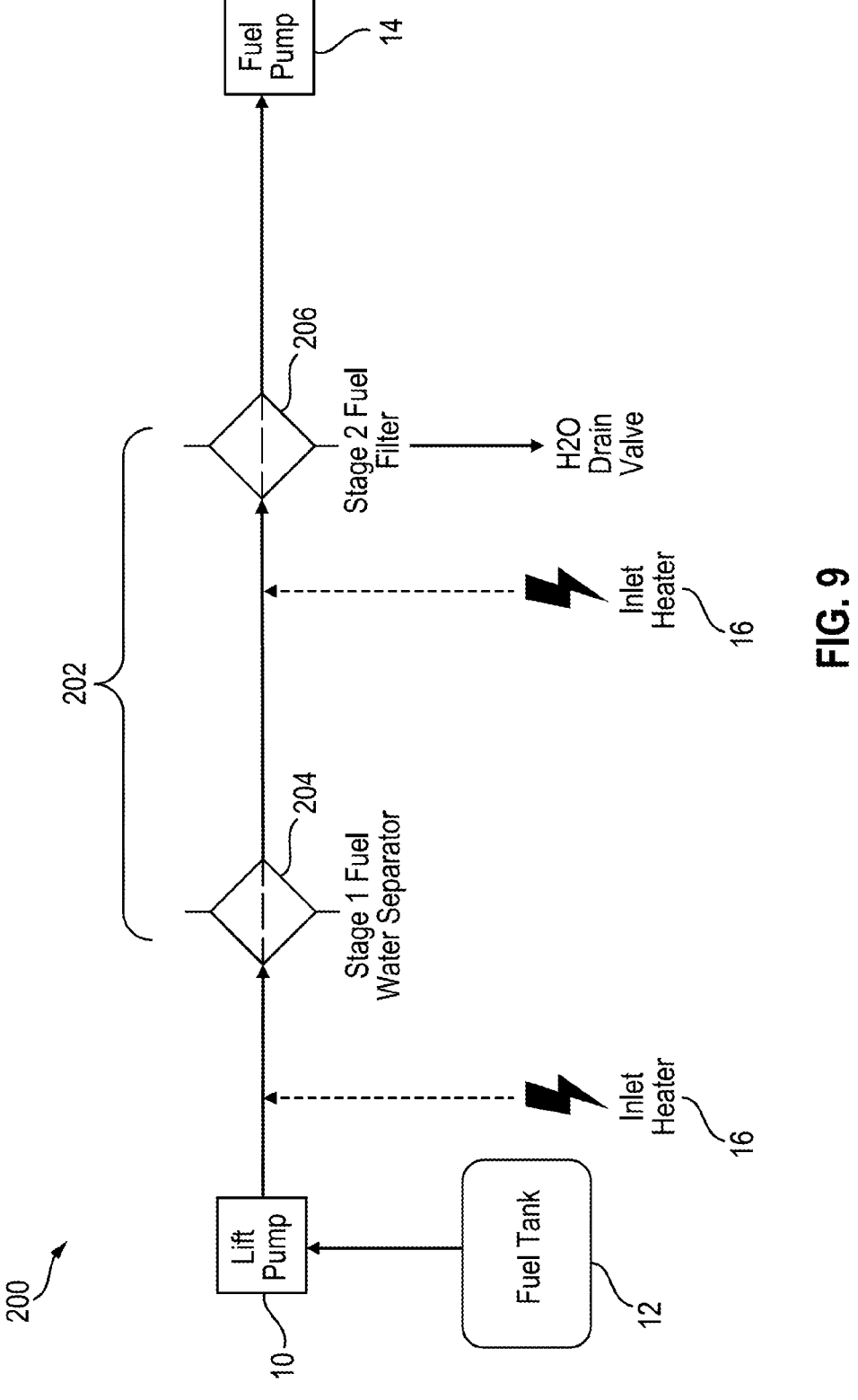
FIG. 9 is a schematic diagram of a filtration system, according to an embodiment.

FIGS. 9-15 show a multiple stage (e.g., two stage) diesel fuel filtration system, shown as filtration system 200, according to an embodiment. As shown in FIG. 9, the filtration system 200 is configured to fluidly couple to a lift pump 10 (e.g., an in-tank pump, etc.), which is used to direct fuel from a fuel tank 12 toward a first stage 204 of a two stage filter assembly 202, and a fuel pump 14 (e.g., a low and/or high pressure pump), which is configured to direct fuel from a second stage 206 of the two stage filter assembly 202 to a fuel injection system of an internal combustion engine. Fuel leaving the lift pump 10 at elevated pressure (e.g., 7 bar) is passed to the first stage 204, then through an inlet heater 16 (e.g., an electric heater) disposed between the first stage 204 and the second stage 206, and from the second stage 206 to the fuel pump 14. The inlet heater 16 may be a direct current (DC) electric heater (e.g., a 12 V, 300 W heater), or another suitable fluid heater type/size. In other embodiments, the position of the inlet heater 16 may be different. For example, the inlet heater 16 may be disposed at an inlet to the first stage 204 rather than the second stage

206, to reduce the risk of fuel gelling within the first stage 204 during operation in cold weather conditions.

Figure 10:
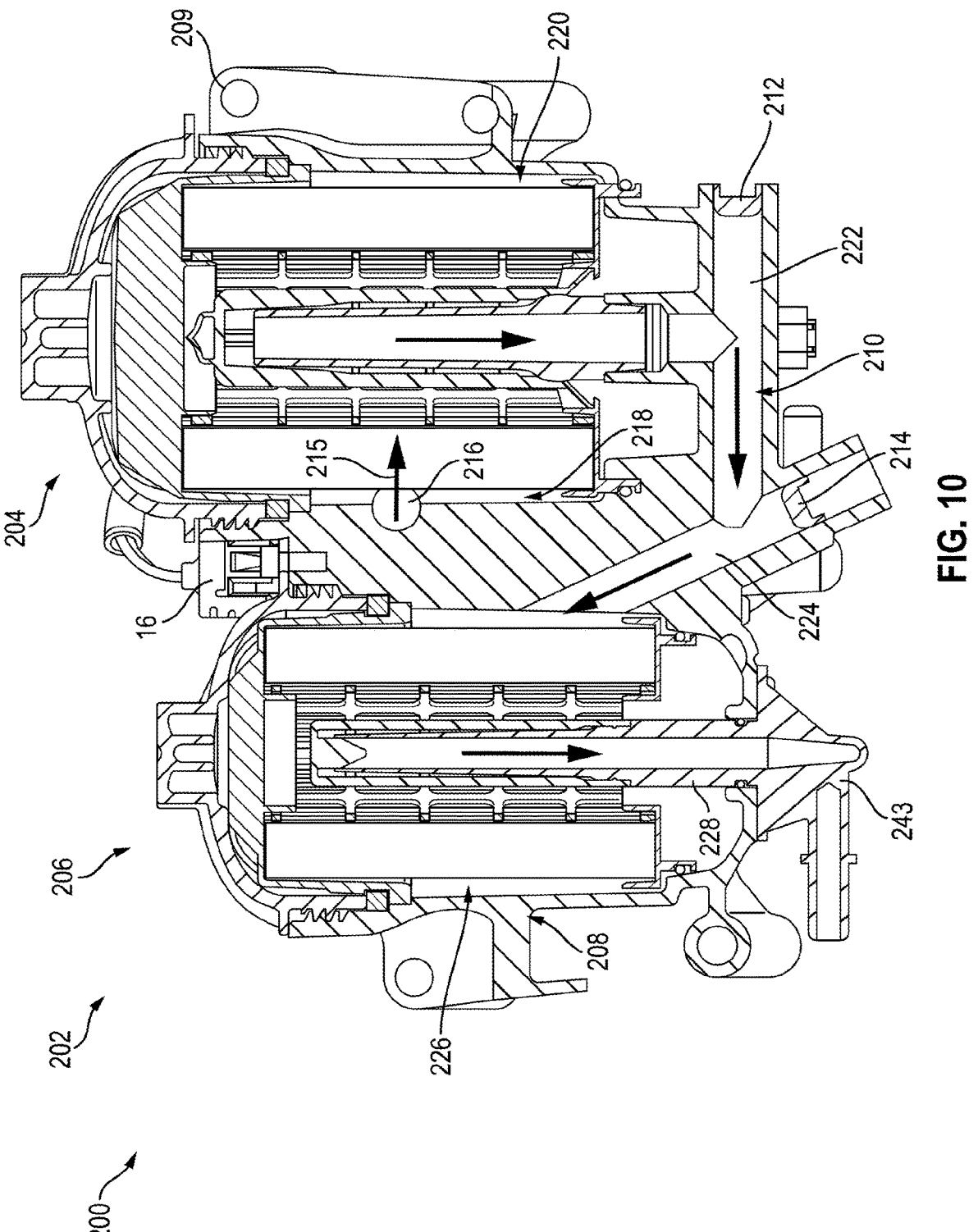
FIG. 10 is a side cross-sectional view of a two stage filter assembly, according to an embodiment.
Figure 11:
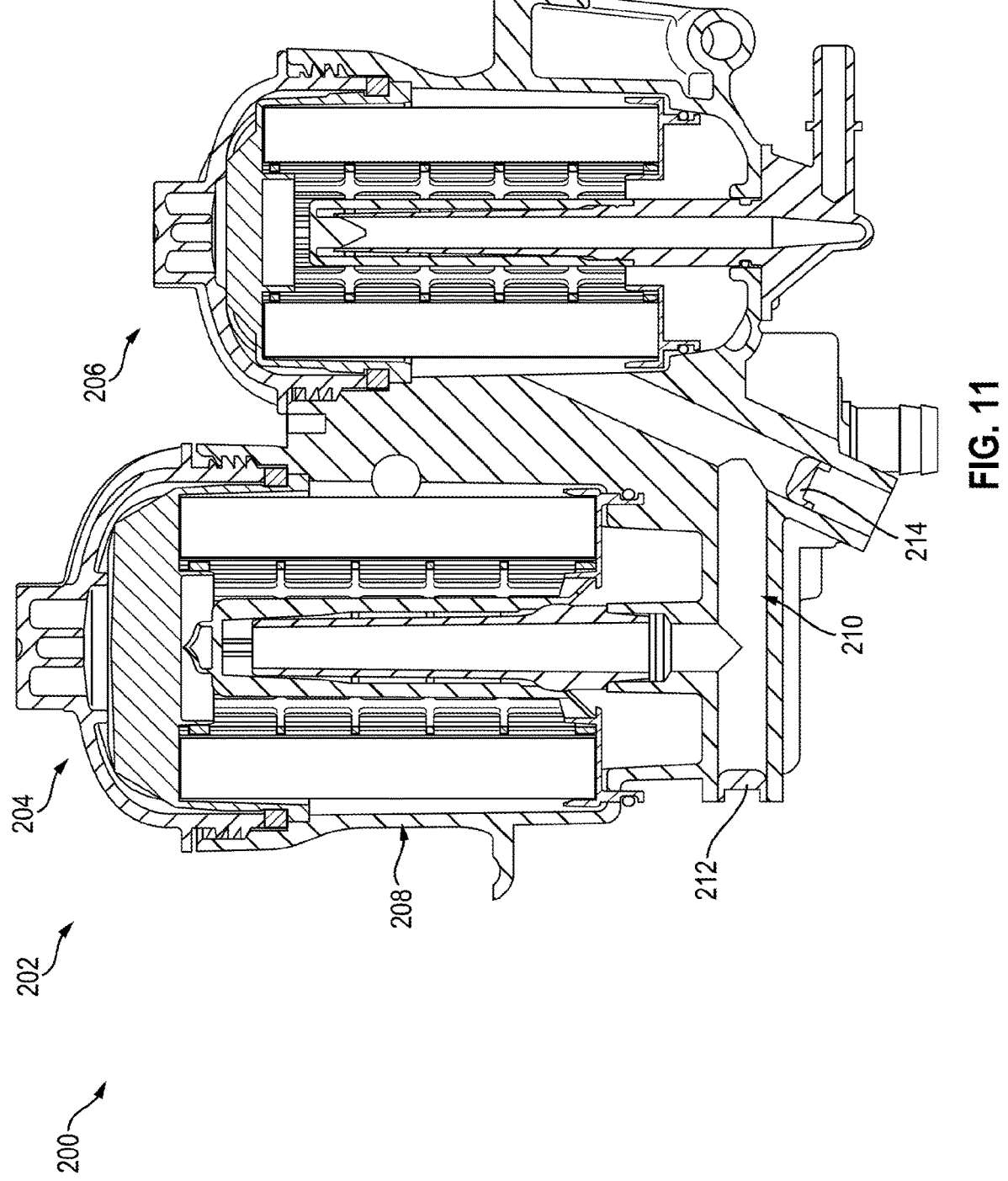
FIG. 11 is another side cross-sectional view of the two stage filter assembly of FIG. 10.

FIGS. 10-15 show various cross-sectional views of the two stage filter assembly 202 of FIG. 9, according to an embodiment. As shown, the two stage filter assembly 202 includes a filter housing 208 that is shared between the first stage 204 and the second stage 206. The filter housing 208 is integrally cast (e.g., die cast, etc.) or otherwise formed from a single piece of material. The filter housing 208 includes mounts 209 to facilitate installation of the two stage filter assembly 202 onto a vehicle chassis or engine. Among other benefits, this single housing construction provides a more compact design relative to using separate filter assemblies with separate housings (e.g., one for each stage of filtration). The two stage filter assembly 202 incorporates various components of the filtration system 200 into a single module. For example, as shown in FIGS. 10-11, the two stage filter assembly 202 includes an cross-flow conduit 210 that is integrated into the filter housing 208 and that fluidly couples the first stage 204 (e.g., a clean side of the first stage 204) and the second stage 206 (e.g., a dirty side of the second stage 206). The two stage filter assembly 202 also includes diagnostic ports 212, 214 that allow access to different flow legs (e.g., channel portions) of the cross-flow conduit 210. The diagnostic ports 212, 214 facilitate the installation of sensors (e.g., pressure sensors, temperature sensors, flow sensors, etc.) for monitoring the operation of the filtration system 200, or for maintenance purposes (e.g., to clean out and/or inspect the cross-flow conduit 210 for blockages).

Figure 12:
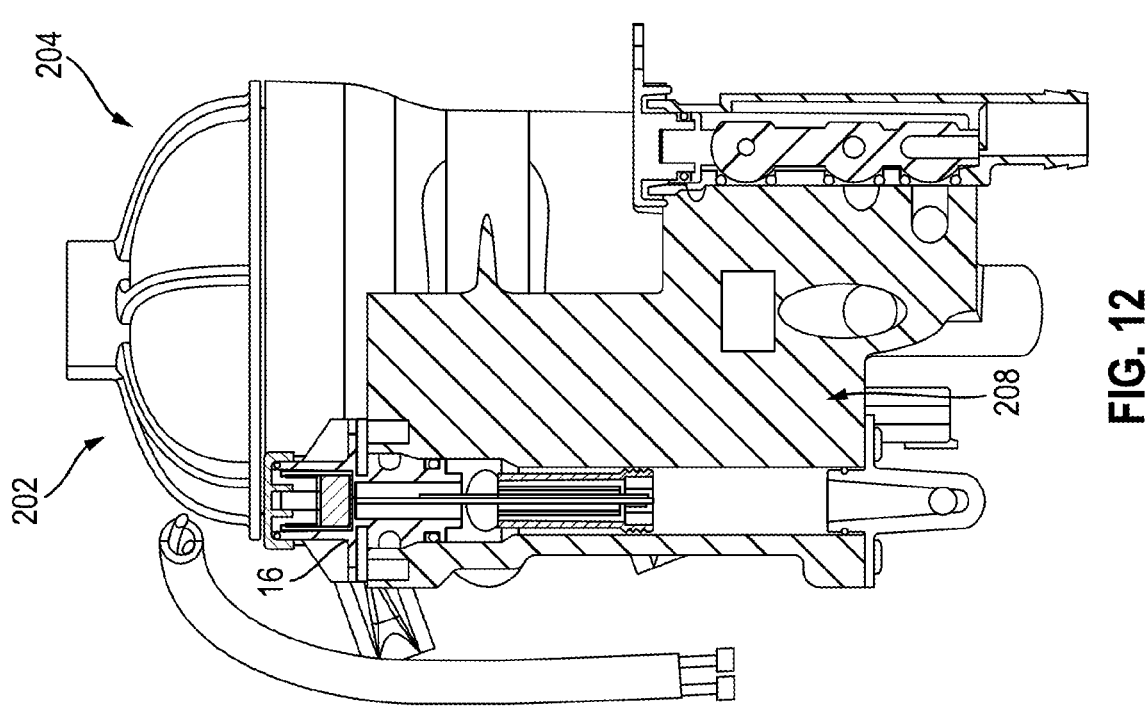
FIG. 12 is a side cross-sectional view of an inlet conduit portion of the two stage filter assembly of FIG. 10.

As shown in FIG. 12, the fluid is preheated before entering the first stage 204, via an inlet heater 16 (e.g., electric heater, stick heater) that is disposed between an inlet conduit (e.g., a quick connect inlet fitting) of the two stage filter assembly 202 and the inlet port 216 to the annular cavity 218 (see FIG. 10). The inlet heater 16 is detachably coupled to the filter housing 208 and may be removed from a port at the top of the filter housing 208 for maintenance and/or replacement. As indicated by the flow arrows 215 in FIG. 10, flow entering the two stage filter assembly 202 is introduced from an inlet port 216 to an annular cavity 218 on the dirty side of a first stage filter element assembly 220. The flow then passes through the first stage filter element assembly 220 and into a horizontal leg 222 of the cross-flow conduit 210. The clean fluid from the first stage 204 continues to a vertical leg 224 of the cross-flow conduit 210 and into a dirty side of the second stage 206. From there, the fluid passes through a second stage filter element assembly 226 and through a standpipe 228 to an outlet port and the rest of the filtration system 200. As shown for any of the above embodiments, the filter element for the second stage 206 may have an injection molded center post (e.g., upper portion of standpipe 228) with an integrated outlet quick-connect port/fitting 243 to ensure an optimum cleanliness level for fuel flowing out of the module. The center post may include a no filter no run (NFNR) ball feature to ensure a filter element is present within the filter assembly and to prevent fuel from being delivered to the engine system when a non-genuine filter element is placed into the filter assembly.

Figure 13:
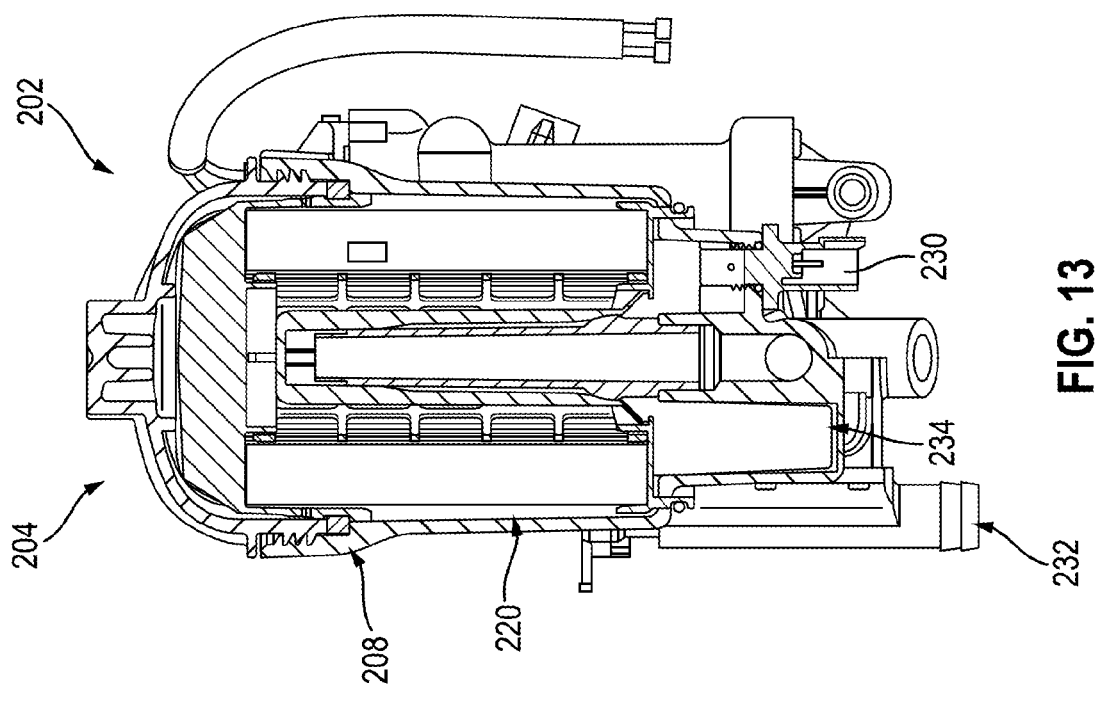
FIG. 13 is a side cross-sectional view of a first stage portion of the two stage filter assembly of FIG. 10.
Figure 15:
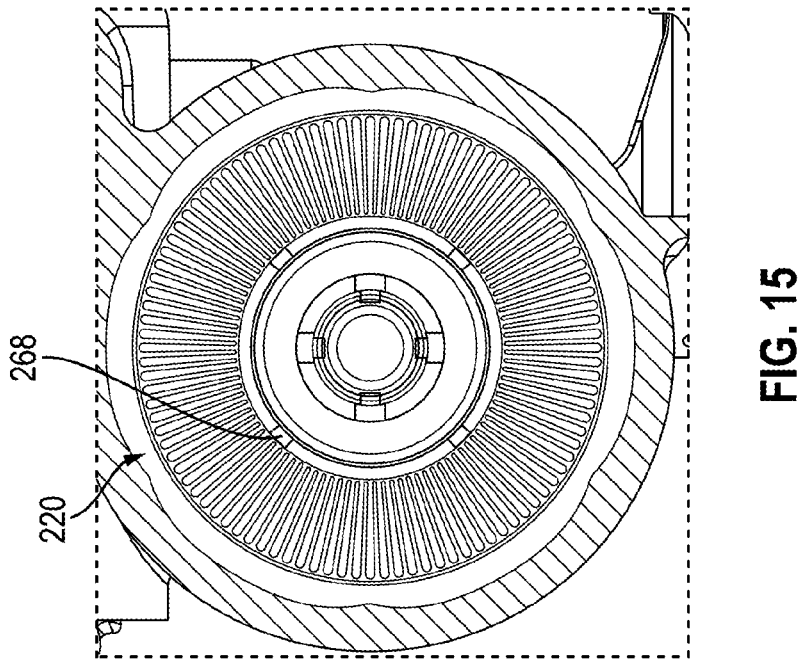
FIG. 15 is a top view of a first stage portion of the two stage filter assembly of FIG. 10.
Figure 14:
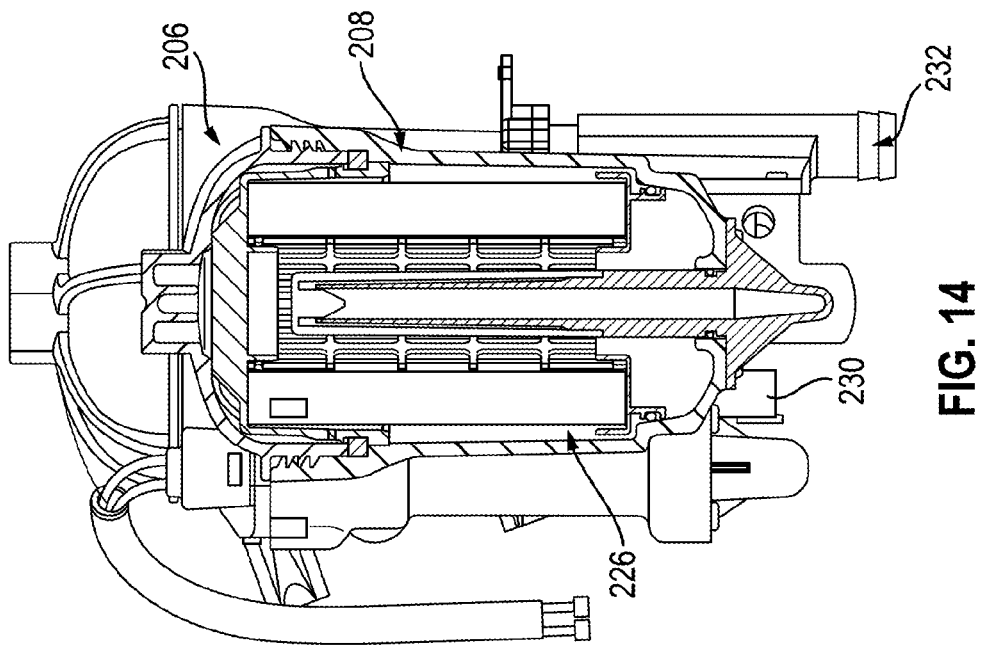
FIG. 14 is a side cross-sectional view of a second stage portion of the two stage filter assembly of FIG. 10.

As shown in FIGS. 13-14, each of the first stage 204 and the second stage 206 include an integrated fuel collecting sump (e.g., cavity, etc.) below first stage filter element assembly 220 and the second stage filter element assembly 226, respectively, to collect water that has been separated by the first stage filter element assembly 220 or the second stage filter element assembly 226. As shown in FIG. 12, the filtration system 200 also includes at least one integrated water-in-fuel (WIF) sensor 230 to determine when water needs to be drained from the filter housing 208, through a drain valve assembly 232 that fluidly couples an inner cavity 234 of the filter housing 208 to an environment surrounding the two stage filter assembly 202. The structure of the drain valve assembly 232 may be the same or similar to the drain valve assembly 118 described with reference to FIGS. 1-5. For example, as shown in FIG. 15, any water that coalesces toward the lower end of the first stage filter element assembly 220 or that is separated downstream of the first stage filter element assembly 220 is directed through openings at the lower end (e.g., through a perforated extension 268 between an inner and outer portion of the first stage filter element assembly 220) to the fuel collecting sump and the drain valve assembly 232. In at least one embodiment, the drain valve assembly 232 is shared between each of the first stage 204 and the second stage 206. In other embodiments, each filter stage includes its own separate drain valve assembly 232.

Figure 17:
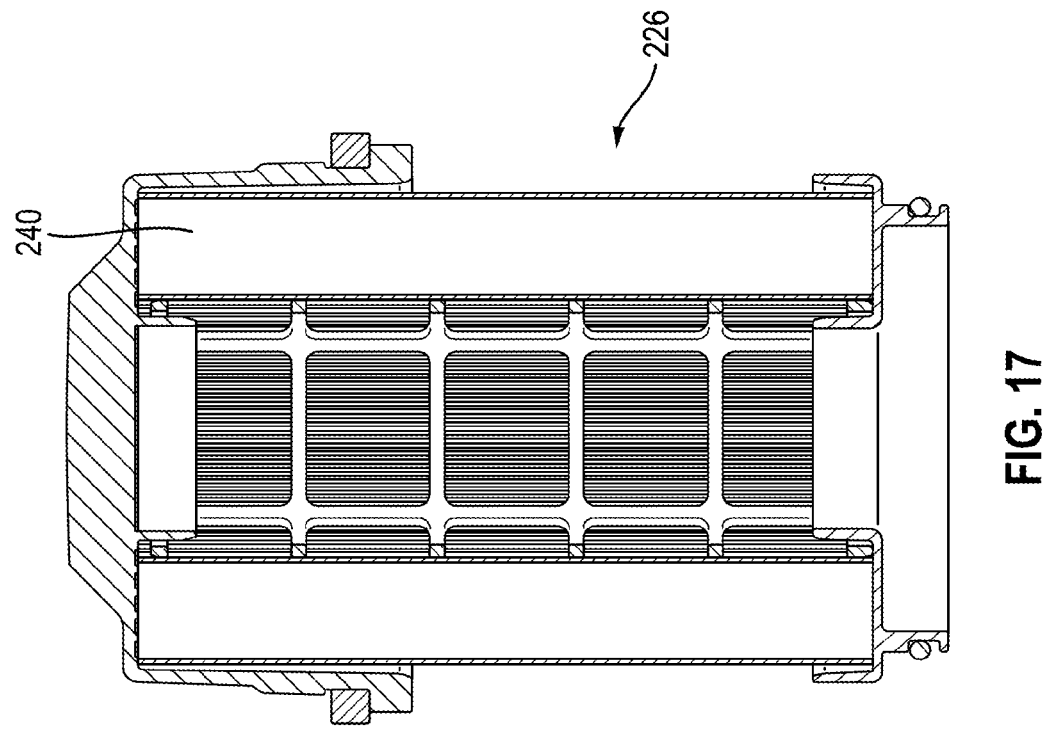
FIG. 17 is a side cross-sectional view of a second filter element of the two stage filter assembly of FIG. 10.
Figure 16:
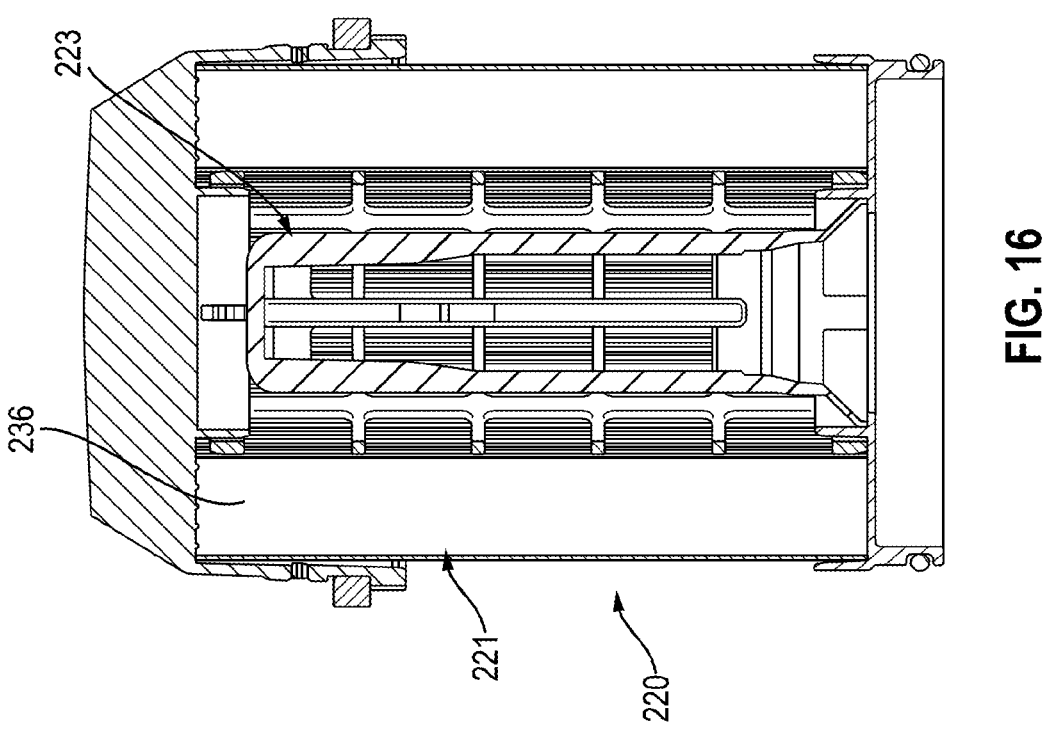
FIG. 16 is a side cross-sectional view of a first filter element of the two stage filter assembly of FIG. 10.

As with the filter assembly 101 described with reference to FIGS. 1-5, each stage of the filtration system 200 of FIGS. 9-15 includes a removable fuel filter element assembly (e.g., cartridge, etc.) and an interlocking seal mechanism that is formed at least partially by an endplate of the filter element assembly (e.g., a first endplate, an upper endplate, etc.). FIGS. 16-17 show side cross-sectional views of the first stage filter element assembly 220 and the second stage filter element assembly 226, respectively. The construction of each filter element assembly may be the same or similar to the construction of the filter element assembly 103 described with reference to FIG. 6. As shown in FIGS. 16-17, an outer portion 221 of the first stage filter element assembly 220 includes an outer media pack 236 and an inner portion 223. In at least one embodiment, the inner portion 223 includes a hydrophobic screen assembly. The second stage filter element assembly 226 includes an outer media pack 240 only. In other embodiments, the arrangement of the first stage filter element assembly 220 and the second stage filter element assembly 226 may be different.

Figure 19:
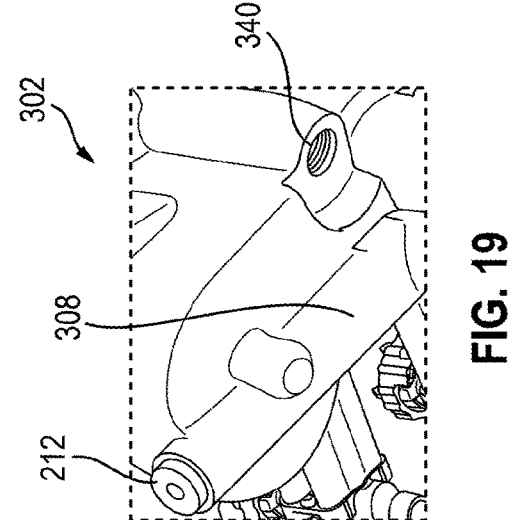
FIG. 19 is a bottom perspective view of a portion of the two stage filter assembly of FIG. 18.
Figure 18:
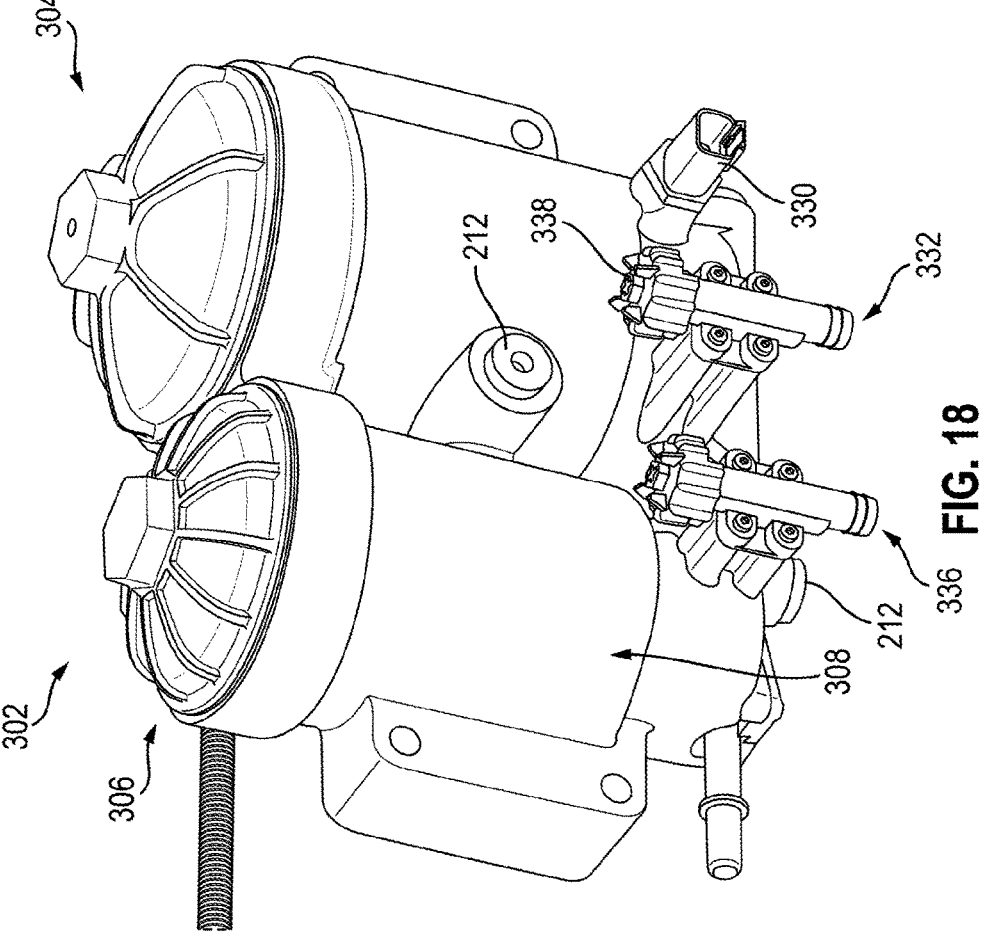
FIG. 18 is a perspective view of a two stage filter assembly, according to another embodiment.
Figure 20:
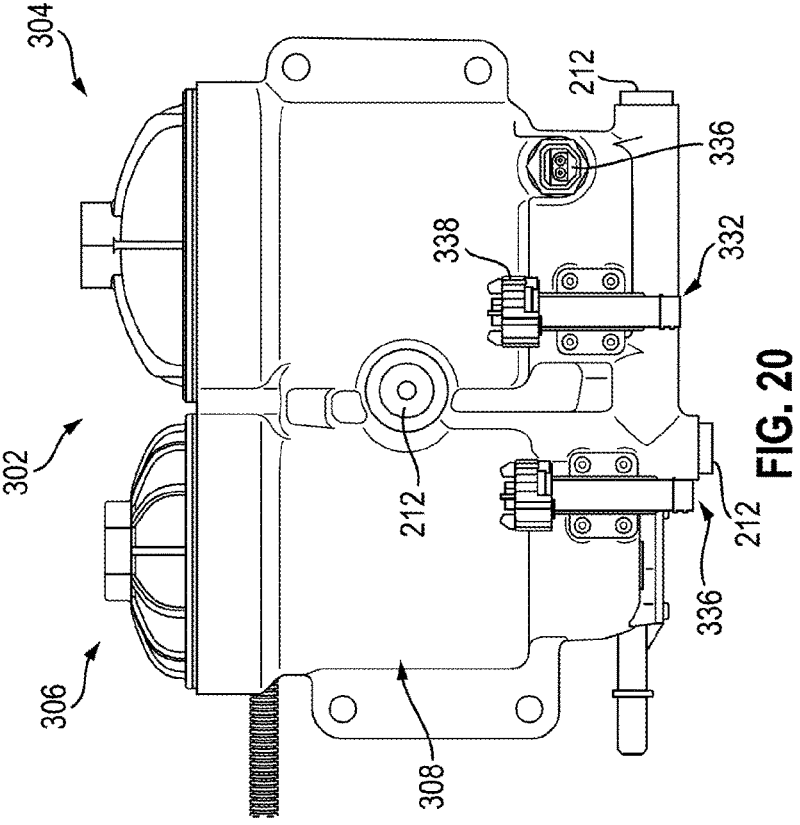
FIG. 20 is a front side view of the two stage filter assembly of FIG. 18.

FIGS. 18-22 show a two stage filter assembly 302, according to another embodiment. The two stage filter assembly 302 includes a filter housing 308 that is shared between the first stage 304 and the second stage 306. As shown in FIGS. 18 and 20, the first stage 304 includes an integrated water-in-fuel (WIF) sensor 330 to determine when water needs to be drained from the filter housing 308, through a drain valve assembly 332 that fluidly couples an inner cavity (e.g., first inner cavity 334, second inner cavity 335) of the filter housing 308 to an environment surrounding the filter housing 308 (see also FIG. 22). In at least one embodiment, the second stage 306 also includes a WIF sensor. In the embodiment of FIGS. 18-22, the second stage 306 includes a drain valve assembly 336 that is separate from the drain valve assembly 332 of the first stage 304. Each drain valve assembly also includes an actuator 338 (e.g., a rotatable knob, etc.) that can be manually manipulated by a user to drain fluid from the water collection sump for each of the first stage 304 and the second stage 306.

Figure 21:
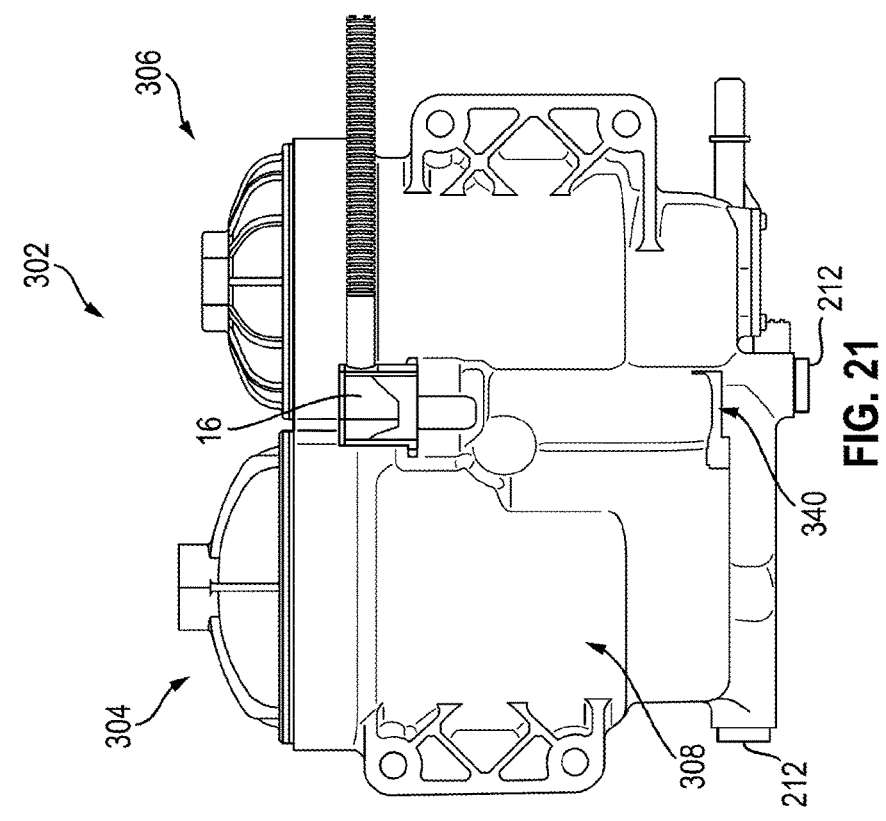
FIG. 21 is a rear side view of the two stage filter assembly of FIG. 18.

As shown in FIGS. 19 and 21, an inlet fitting 340 for the two stage filter assembly 302 is integrally formed into a lower end (e.g., rear end) of the filter housing 308. The two stage filter assembly 302 also includes an inlet heater 16 (e.g., electric heater, stick heater, etc.) that is detachably coupled to the filter housing 308 via a port at a top end of the filter housing 308, in between the first stage 304 and the second stage 306. As shown in FIGS. 18-21, the two stage filter assembly 302 includes a plurality of diagnostic ports 212 (e.g., closed off with fittings) to facilitate maintenance, add sensors, or the like.

Figure 22:
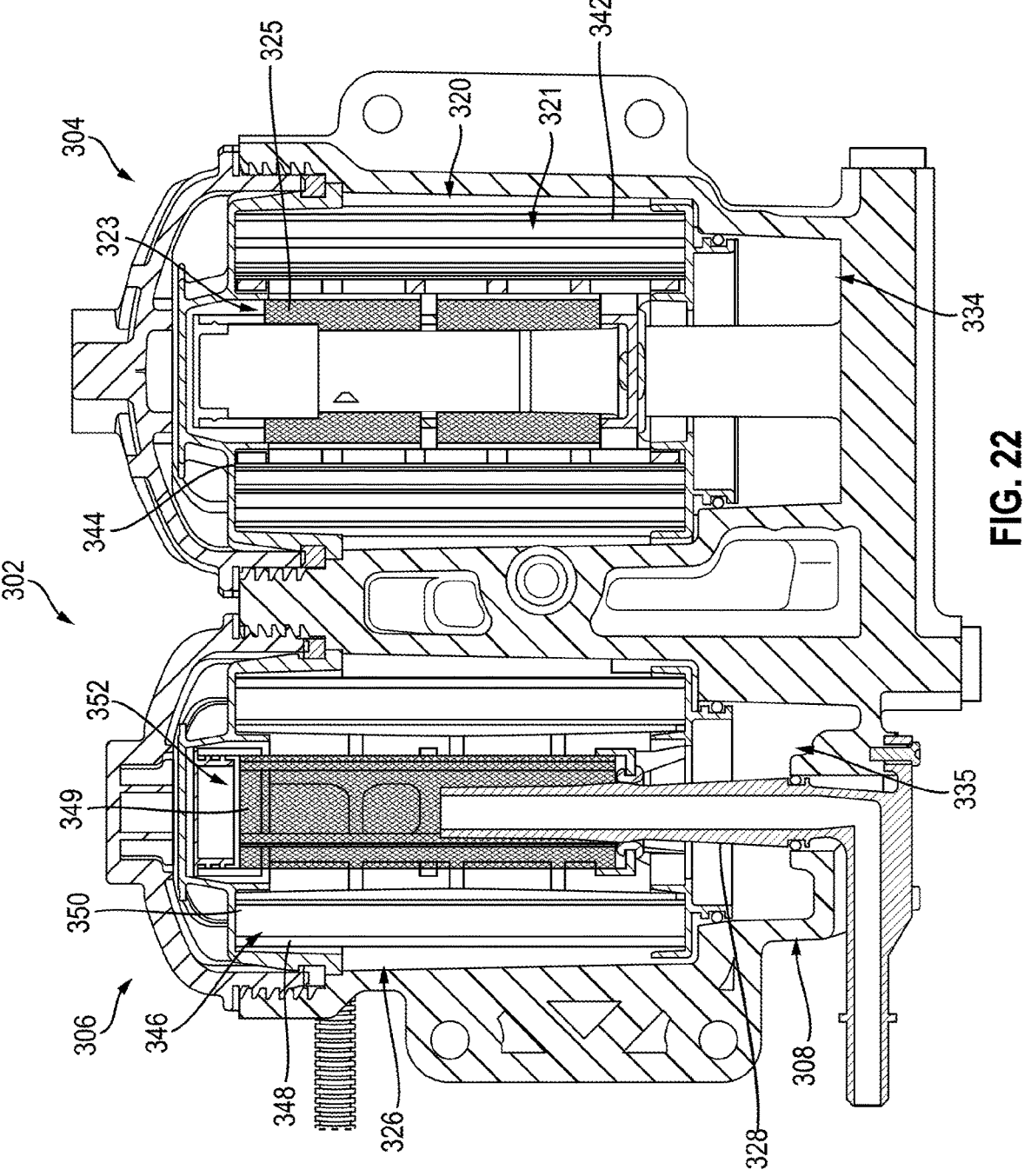
FIG. 22 is a side cross-sectional view of the two stage filter assembly of FIG. 18.

As shown in FIG. 22, each stage of the two stage filter assembly 302 includes a filter element assembly (e.g., cartridge such as a SmartLock cartridge, etc.) that is removable through a respective one of the lids for the first stage 304 and the second stage 306. An inner cavity for each of the first stage 304 and the second stage 306 is sealed from an environment surrounding the filter housing 308 by an interlocking seal mechanism that is formed, at least in part, by a sealing member disposed on a first endplate of each filter element assembly. The filter housing 308 may be a die cast aluminum housing, or made from another suitable material. The spin-on lids for each of the first stage 304 and the second stage 306 may be made from a composite material, plastic, or another suitable material. In at least one embodiment, the two stage filter assembly 302 may be operable without one of the two filter element assemblies. For example, the two stage filter assembly 302 may be used with the second stage filter element assembly 326 removed from the filter housing 308 to provide a single stage of filtration, without impacting the pressure drop across the two stage filter assembly 302 (e.g., with a reduced pressure drop across the second stage 306).

The construction of each filter element assembly may be the same or similar to the construction of the filter element assemblies described with reference to the embodiments of FIG. 1-5 or 10-15. As shown in FIGS. 22-24, an outer portion 321 of the first stage filter element assembly 320 includes a pleated media 342 and a coalescing wrap 344 that is nested within the pleated media 342, such that the pleated media 342 circumscribes the coalescing wrap 344. An inner portion 323 of the first stage filter element assembly 320 includes a hydrophobic screen 325 to separate any water from the fuel that is not removed via the coalescing wrap 344. As shown in FIGS. 22 and 25-26, the structure of the second stage filter element assembly 326 is similar to the first stage filter element assembly 320. Again, an outer portion 346 of the second stage filter element assembly 326 includes a pleated media 348 that and a coalescing wrap 350 nested within the pleated media 348. An inner portion 352 of the second stage filter element assembly 326 includes a hydrophobic screen 349. Water collected at the base of the coalescing wrap or that is separated by the hydrophobic screen for each of the first stage 304 and the second stage 306 is directed through openings in the second endplate (e.g., lower endplate) to a water collection sump at the base of the filter housing 308 for each of the first stage 304 and the second stage 306. In the embodiment of FIGS. 22-26, each of the first stage filter element assembly 320 and the second stage filter element assembly 326 are incinerable (e.g., made from non-metallic materials such as plastics, media, etc.).

Figure 28:
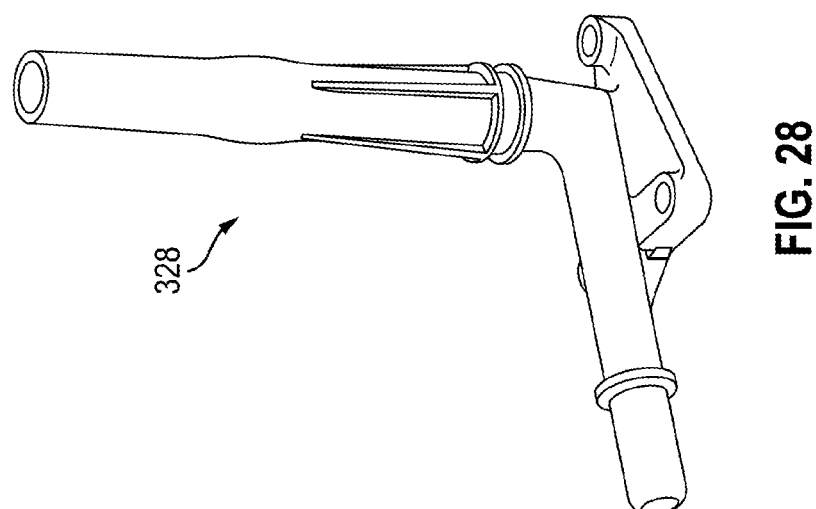
FIG. 28 is a perspective view of a standpipe of the two-stage filter assembly of FIG. 18.
Figure 27:
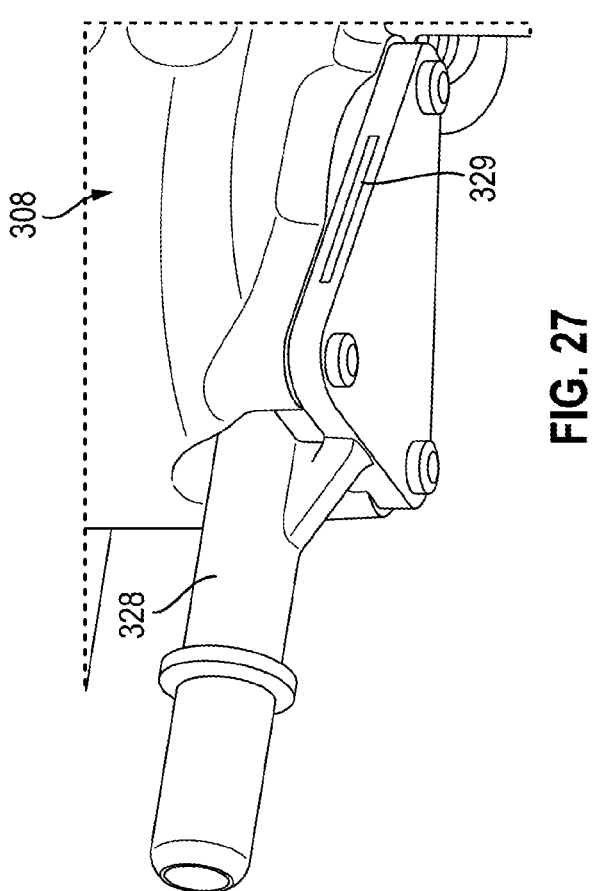
FIG. 27 is a bottom perspective view of an outlet conduit portion of the two-stage filter assembly of FIG. 18.

As shown in FIG. 22, clean fuel leaving the two stage filter assembly 302 is directed through a standpipe 328 that is disposed at least partially within an inner cavity for the second stage 306. The standpipe 328 is detachably coupled to the filter housing 308 and extends axially upwardly through an opening at the base of the second stage 306. FIGS. 27-28 show perspective and side views of the standpipe 328. As shown, the standpipe 328 is molded or otherwise formed from a single piece of material (e.g., nylon, etc.), which helps control cleanliness and reduces the need to have exceedingly clean module components upstream of the standpipe 328. In the embodiment of FIG. 27, the standpipe 328 includes a stabilizing plate 329 that is made from a metal or another suitable material to increase the strength of the standpipe 328 and the connection between the standpipe 328 and the filter housing 308. The stabilizing plate 329 may be molded into a base of the standpipe 328 or otherwise joined or engaged with the base to increase the strength of the standpipe 328 and connection.

Figure 29:
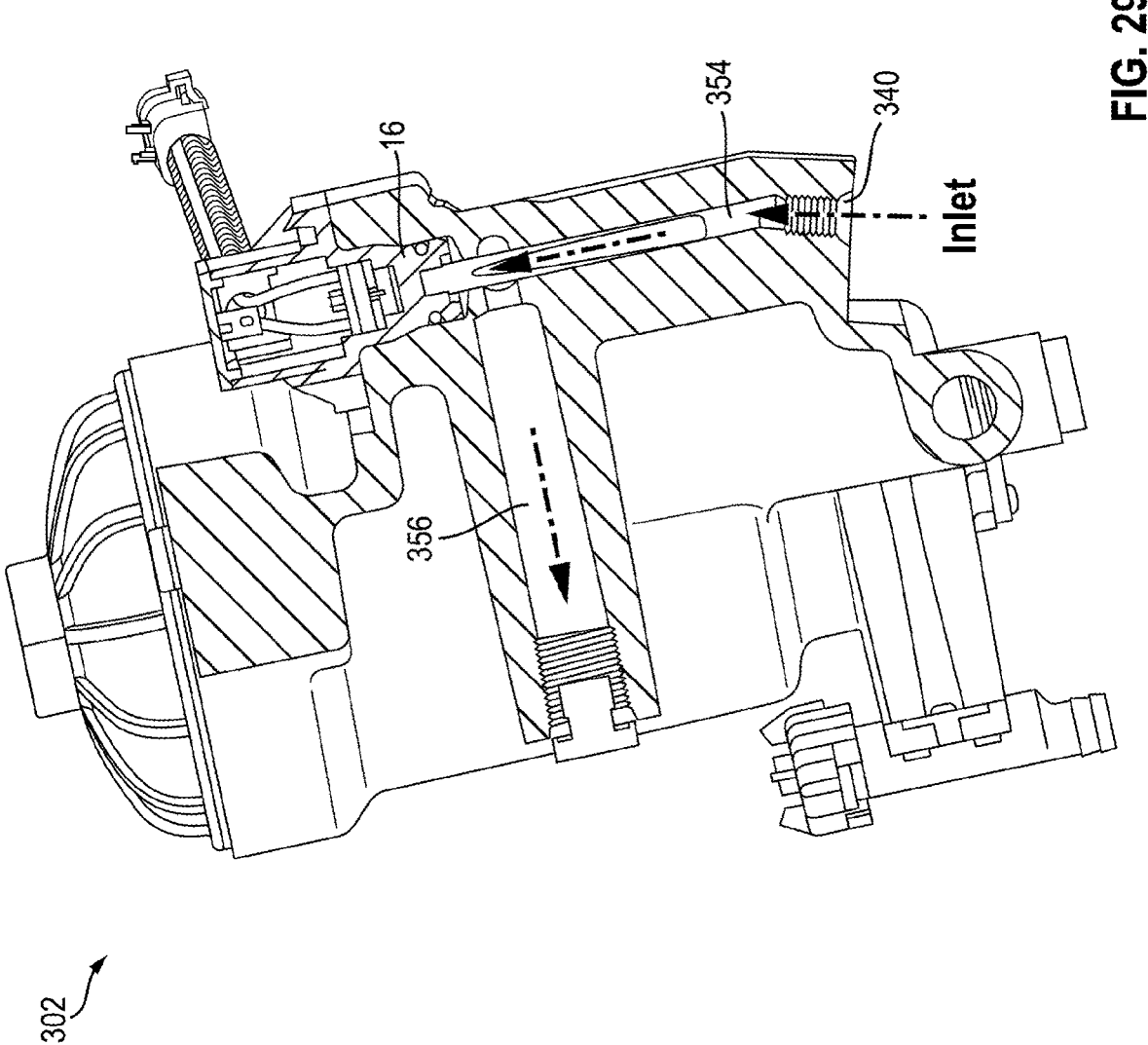
FIG. 29 is another side cross-sectional view of the two stage filter assembly of FIG. 18.
Figure 30:
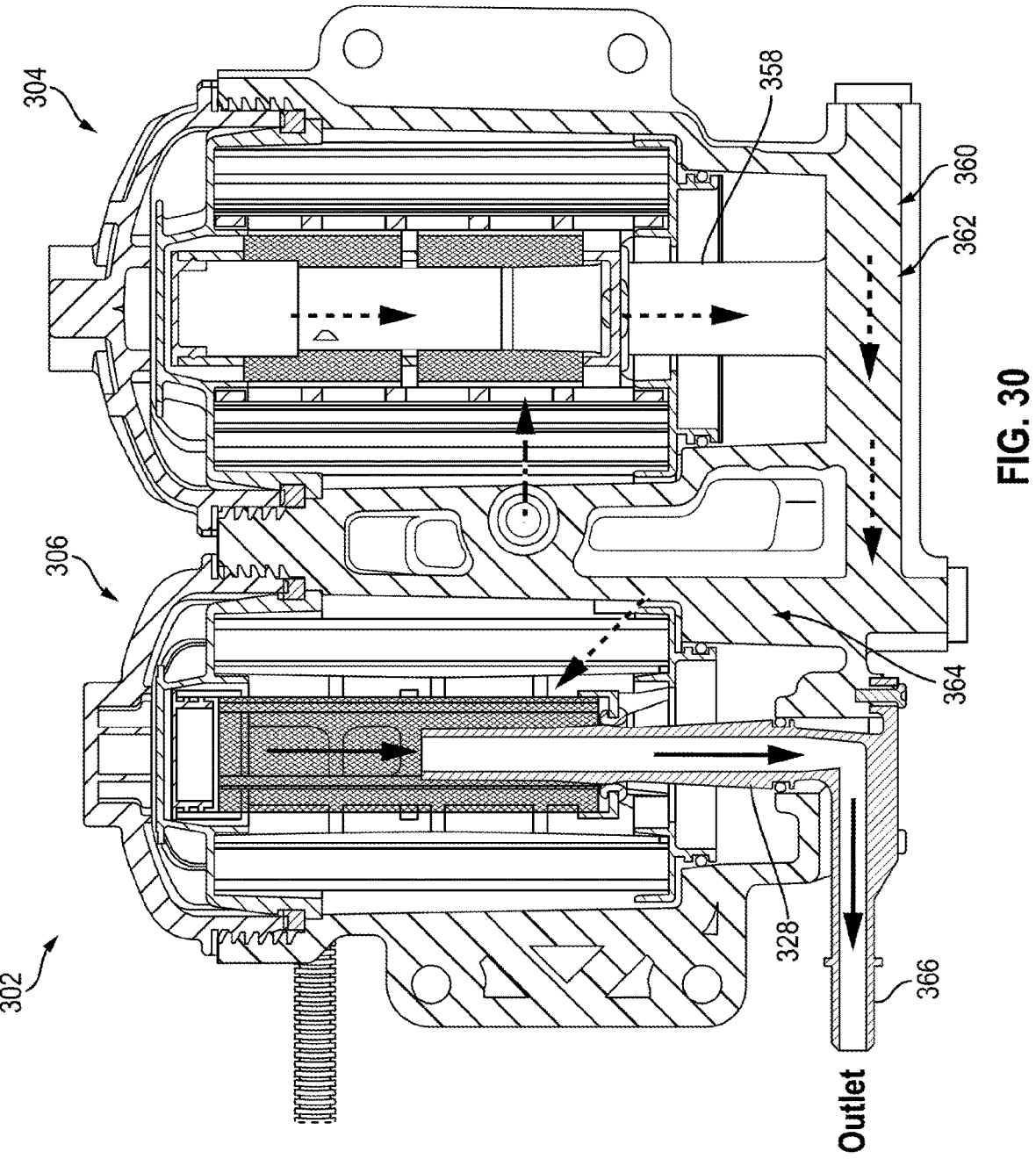
FIG. 30 is another side cross-sectional view of the two stage filter assembly of FIG. 18.

FIGS. 29-30 show the flow path through the two stage filter assembly 302. As shown, flow enters through the inlet fitting 340 and passes vertically through a first portion 354 (e.g., leg) of an inlet channel, which contains a heating element for the inlet heater 16, and horizontally through a second portion 356 of the inlet channel toward the first stage 304. Clean fluid leaving the first stage 304 passes through a center tube 358 in the first stage 304 and through a first leg 360 (e.g., horizontal leg) of a cross-flow channel 362 that extends between the first stage 304 and the second stage 306. Flow continues through a second leg 364 (e.g., vertical leg) of the cross-flow channel 362 and is introduced to a dirty side of the second stage 306. Clean fluid leaving the second stage 306 is directed, via the standpipe 328 to an outlet fitting 366 and the rest of the fuel filtration system.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
    a filter housing, comprising:
        a shell defining an inner cavity, wherein the shell comprises a first side wall having an interior surface defining at least in part the inner cavity; and
        a lid configured to engage the shell at an opening of the inner cavity, wherein the lid comprises a second side wall positioned radially inwardly and engaged with the first side wall of the shell; and
    a filter element disposed within the inner cavity, the filter element comprising:
        a media pack having a media pack first end and a media pack second end opposite the media pack first end;
        a first endplate sealingly engaged with the media pack first end, the first endplate comprising a skirt extending along a longitudinal axis of the media pack from the media pack first end toward the media pack second end; and
        a sealing member coupled to the skirt and disposed proximate a lower end of the skirt, the sealing member positioned between and forming a seal between the lid and the shell, wherein the sealing member engages the interior surface of the first side wall; and
        wherein the shell sealingly engages a second end plate sealingly engaged with the media pack second end.

2. The filter assembly of claim 1, wherein the media pack is an outer media pack defining a central cavity, and further comprising an inner media pack disposed within the central cavity.

3. The filter assembly of claim 2, wherein the first endplate is coupled to both the outer media pack and the inner media pack.

4. The filter assembly of claim 1, wherein the lid engages an upper axial end surface of the sealing member, and wherein the shell defines an upper ledge that engages a lower axial end surface of the sealing member opposite the upper axial end surface.

5. The filter assembly of claim 1, wherein the sealing member protrudes radially beyond an outer perimeter of the first endplate.

6. The filter assembly of claim 1, wherein the sealing member is disposed at an intermediate position between opposing axial ends of the media pack.

7. The filter assembly of claim 1, wherein the skirt comprises a first protrusion and a second protrusion spaced axially apart from the first protrusion, the first protrusion and the second protrusion together defining a recessed area sized to receive the sealing member therein, wherein an outer radius of the second protrusion is greater than an outer radius of the first protrusion.

8. The filter assembly of claim 1, wherein the shell defines a lower ledge that engages a lower end of the skirt.

9. The filter assembly of claim 1, further comprising a protrusion disposed proximate a lower end of the skirt, the protrusion engaged with a lower axial surface of the sealing member.

10. The filter assembly of claim 1, wherein the lid comprises an axial sidewall that is sealingly engaged with the sealing member.

11. The filter assembly of claim 10, wherein the axial sidewall is disposed within the inner cavity of the shell when the lid is installed into the shell.

12. A filter element, comprising:
a media pack having a media pack first end and a media pack second end opposite the media pack first end;
a first endplate sealingly engaged with the media pack first end, the first endplate comprising a skirt extending along a longitudinal axis of the media pack from the media pack first end toward the media pack second end, wherein the skirt comprises an upper protrusion and a lower protrusion spaced axially apart from the upper protrusion, the upper protrusion and the lower protrusion together defining a recessed area, wherein an outer radius of the lower protrusion is greater than an outer radius of the upper protrusion;
a first sealing member coupled to the skirt and disposed in the recessed area proximate a lower end of the skirt, the first sealing member circumferentially surrounding the media pack, the first sealing member protruding beyond an outer perimeter of the first endplate;
a second endplate sealingly engaged with the media pack second end, the second endplate comprising an axial sidewall and an inner perimeter;
a second sealing member coupled to the axial sidewall and protruding radially outwardly from the axial sidewall; and
a third sealing member coupled to the second endplate and disposed radially inwardly from the inner perimeter.

13. The filter element of claim 12, wherein the media pack is an outer media pack defining a central cavity, and further comprising an inner media pack disposed within the central cavity.

14. The filter element of claim 13, wherein the first endplate is coupled to both the outer media pack and the inner media pack.

15. The filter element of claim 12, wherein the first sealing member protrudes radially beyond the outer perimeter of the first endplate.

16. The filter element of claim 12, wherein the first sealing member is disposed at an intermediate position between opposing axial ends of the media pack.

17. The filter element of claim 12, further comprising a protrusion disposed proximate a lower end of the skirt, the protrusion engaged with a lower axial surface of the sealing member.

18. A filter assembly, comprising:
a filter housing, comprising:
a shell defining an inner cavity;
a lid configured to engage the shell at an opening of the inner cavity; and
a drain valve fluidly coupling the inner cavity to an environment surrounding the shell; and
a filter element disposed within the inner cavity, the filter element comprising:
an outer media pack defining a central cavity having a longitudinal axis;
an inner media pack disposed within the central cavity; and
an endplate sealingly engaged with both the outer media pack and the inner media pack, wherein the outer media pack and the inner media pack are not moveable relative to each other along the longitudinal axis, the endplate defining an opening positioned between the inner media pack and the outer media pack, the opening fluidly coupled to the drain valve, wherein the endplate comprises an axial sidewall extending away from the outer media pack and an inner perimeter;
a first sealing member coupled to the axial sidewall and protruding radially outwardly from the axial sidewall; and
a second sealing member coupled to the endplate and disposed radially inwardly from the inner perimeter.

19. The filter assembly of claim 18, the endplate comprising a first pair of sidewalls defining a first channel and a second pair of sidewalls defining a second channel, the first pair of sidewalls coupled to the second pair of sidewalls by a perforated extension.

20. The filter assembly of claim 18, wherein the drain valve comprises a port, the drain valve configured to allow for water to flow from the inner cavity to the environment surrounding the shell through the port while allowing air to flow back in simultaneously through the port.

* * * * *